(12) United States Patent
Faenza, Jr. et al.

(10) Patent No.: US 7,093,767 B2
(45) Date of Patent: Aug. 22, 2006

(54) SYSTEM AND METHOD FOR MANUFACTURING A PUNCH-OUT RFID TRANSACTION DEVICE

(75) Inventors: William J. Faenza, Jr., New York, NY (US); Ellen Lasch, New York, NY (US); Peter D. Saunders, Salt Lake City, UT (US); Lisa Webb, Darien, CT (US)

(73) Assignee: American Express Travel Related Services Company, Inc., New York, NY (US)

( * ) Notice: Subject to any disclaimer, the term of this patent is extended or adjusted under 35 U.S.C. 154(b) by 218 days.

(21) Appl. No.: 10/708,549

(22) Filed: Mar. 10, 2004

(65) Prior Publication Data

US 2004/0256469 A1    Dec. 23, 2004

Related U.S. Application Data

(63) Continuation-in-part of application No. 10/394,914, filed on Mar. 21, 2003, and a continuation-in-part of application No. 10/340,352, filed on Jan. 10, 2003, and a continuation-in-part of application No. 10/192,488, filed on Jul. 9, 2002.

(60) Provisional application No. 60/396,577, filed on Jul. 16, 2002, provisional application No. 60/304,216, filed on Jul. 10, 2001, provisional application No. 60/171,689, filed on Dec. 21, 1999, provisional application No. 60/167,405, filed on Nov. 24, 1999, provisional application No. 60/153,112, filed on Sep. 7, 1999.

(51) Int. Cl.
*G06K 19/06* (2006.01)

(52) U.S. Cl. .................... 235/493; 235/472.02

(58) Field of Classification Search ............. 235/493, 235/472.02
See application file for complete search history.

(56) References Cited

U.S. PATENT DOCUMENTS

D061,466 S    9/1922 Foltz (Continued)

FOREIGN PATENT DOCUMENTS

CH    689070    8/1997

(Continued)

OTHER PUBLICATIONS

"What's New: Timex Watch Features Speedpass System", http://www.speedpass.com/news/article.jsp?id=51 (1 page).

(Continued)

*Primary Examiner*—Thien M. Le
*Assistant Examiner*—Lisa M. Caputo
(74) *Attorney, Agent, or Firm*—Fitzpatrick, Cella, Harper & Scinto

(57) ABSTRACT

The present invention relates to a process for providing an irregularly shaped Radio Frequency operable transaction device using conventional International Standards Organization dimensions for conventional transaction cards and traditional transaction card manufacturing machinery. The invention provides for normal manufacture of a plurality of transaction transporters joined together in a single sheet. The outline of a RFID transaction device is impressed in a center portion of one of the transporters. A RFID transaction device including a RFID module may then be removed, or punched out of the transporter in accordance with the transaction device outline. Alternatively, the RFID module may include an outline pressed into the transporter permitting removal of the module from the transporter independent of the removal of the transaction device. The RFID module may then be removed and used to complete a RFID transaction. The invention further includes a carrying case for securing the RFID module from loss or theft.

29 Claims, 15 Drawing Sheets

U.S. PATENT DOCUMENTS

| | | |
|---|---|---|
| 3,536,894 A | 10/1970 | Travioli |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,838,252 A | 9/1974 | Hynes et al. |
| 3,873,813 A | 3/1975 | Lahr et al. |
| 3,894,756 A | 7/1975 | Ward |
| 3,955,295 A | 5/1976 | Mayer |
| 4,044,231 A | 8/1977 | Beck et al. |
| 4,058,839 A | 11/1977 | Darjany |
| 4,119,361 A | 10/1978 | Greenaway |
| 4,202,491 A | 5/1980 | Suzuki |
| 4,303,904 A | 12/1981 | Chasek |
| 4,361,757 A | 11/1982 | Ehrat |
| D270,546 S | 9/1983 | Malmberg |
| 4,436,991 A | 3/1984 | Albert et al. |
| 4,475,308 A | 10/1984 | Heise et al. |
| 4,504,084 A | 3/1985 | Jauch |
| D280,214 S | 8/1985 | Opel |
| 4,538,059 A | 8/1985 | Rudland |
| 4,547,002 A | 10/1985 | Colgate, Jr. |
| 4,563,024 A | 1/1986 | Blyth |
| 4,583,766 A | 4/1986 | Wessel |
| 4,593,936 A | 6/1986 | Opel |
| 4,597,814 A | 7/1986 | Colgate, Jr. |
| 4,639,765 A | 1/1987 | d'Hont |
| 4,641,017 A | 2/1987 | Lopata |
| 4,672,021 A | 6/1987 | Blumel et al. |
| 4,684,795 A | 8/1987 | Colgate, Jr. |
| 4,692,394 A | 9/1987 | Drexler |
| 4,694,148 A | 9/1987 | Diekemper et al. |
| 4,697,073 A | 9/1987 | Hara |
| 4,711,690 A | 12/1987 | Haghiri-Tehrani |
| 4,739,328 A | 4/1988 | Koelle et al. |
| 4,779,898 A | 10/1988 | Berning et al. |
| 4,794,142 A | 12/1988 | Alberts et al. |
| 4,795,894 A | 1/1989 | Sugimoto et al. |
| 4,852,911 A | 8/1989 | Hoppe |
| 4,863,819 A | 9/1989 | Drexler et al. |
| 4,889,366 A | 12/1989 | Fabbiani |
| D310,386 S | 9/1990 | Michels et al. |
| 4,961,142 A | 10/1990 | Elliott et al. |
| 5,010,243 A | 4/1991 | Fukushima et al. |
| 5,023,782 A | 6/1991 | Lutz et al. |
| 5,053,774 A | 10/1991 | Schuermann et al. |
| 5,099,226 A | 3/1992 | Andrews |
| 5,101,200 A | 3/1992 | Swett |
| 5,106,125 A | 4/1992 | Antes |
| 5,111,033 A | 5/1992 | Fujita et al. |
| 5,142,383 A | 8/1992 | Mallik |
| 5,197,140 A | 3/1993 | Balmer |
| 5,212,777 A | 5/1993 | Gove et al. |
| 5,217,844 A | 6/1993 | Fukushima et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. ............ 264/21 |
| 5,239,654 A | 8/1993 | Ing-Simmons et al. |
| 5,247,304 A | 9/1993 | d'Hont |
| 5,251,937 A | 10/1993 | Ojster |
| 5,256,473 A | 10/1993 | Kotani et al. |
| 5,272,326 A | 12/1993 | Fujita et al. |
| 5,274,392 A | 12/1993 | d'Hont |
| 5,285,100 A | 2/1994 | Byatt |
| 5,300,764 A | 4/1994 | Hoshino et al. |
| 5,304,789 A | 4/1994 | Lob et al. |
| 5,305,002 A | 4/1994 | Holodak et al. |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | d'Hont et al. |
| 5,351,142 A | 9/1994 | Cueli |
| 5,355,411 A | 10/1994 | MacDonald |
| 5,371,896 A | 12/1994 | Gove et al. |
| 5,373,303 A | 12/1994 | d'Hont |
| 5,383,687 A | 1/1995 | Suess et al. |
| 5,407,893 A | 4/1995 | Koshizuka et al. |
| 5,408,243 A | 4/1995 | d'Hont |
| 5,410,142 A | 4/1995 | Tsuboi et al. |
| 5,410,649 A | 4/1995 | Gove |
| 5,428,363 A | 6/1995 | d'Hont et al. |
| 5,453,747 A | 9/1995 | d'Hont et al. |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | d'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | d'Hont |
| 5,500,651 A | 3/1996 | Schuermann |
| 5,513,525 A | 5/1996 | Schurmann |
| 5,514,860 A | 5/1996 | Berson |
| 5,516,153 A | 5/1996 | Kaule |
| 5,518,810 A | 5/1996 | Nishihara et al. |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | d'Hont |
| 5,557,516 A | 9/1996 | Hogan |
| 5,561,430 A | 10/1996 | Knebelkamp |
| 5,563,582 A | 10/1996 | d'Hont |
| 5,569,187 A | 10/1996 | Kaiser |
| 5,572,226 A | 11/1996 | Tuttle |
| 5,577,109 A | 11/1996 | Stimson et al. |
| 5,581,630 A | 12/1996 | Bonneau, Jr. |
| 5,592,150 A | 1/1997 | d'Hont |
| 5,592,405 A | 1/1997 | Gove et al. |
| 5,594,233 A | 1/1997 | Kenneth et al. |
| 5,594,448 A | 1/1997 | d'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,203 A | 3/1997 | Finkelstein et al. |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | d'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | d'Hont |
| 5,625,370 A | 4/1997 | d'Hont |
| 5,625,695 A | 4/1997 | M'Raihi et al. |
| 5,629,981 A | 5/1997 | Nerlikar |

| | | | | | |
|---|---|---|---|---|---|
| 5,638,080 A | 6/1997 | Orthmann et al. | 5,881,272 A | 3/1999 | Balmer |
| 5,640,002 A | 6/1997 | Ruppert et al. | 5,886,333 A | 3/1999 | Miyake |
| 5,646,607 A | 7/1997 | Schurmann et al. | 5,887,266 A | 3/1999 | Heinonen et al. |
| 5,657,388 A | 8/1997 | Weiss | 5,890,137 A | 3/1999 | Koreeda |
| 5,660,319 A | 8/1997 | Falcone et al. | D408,054 S | 4/1999 | Leedy, Jr. |
| 5,673,106 A | 9/1997 | Thompson | 5,898,783 A | 4/1999 | Rohrbach |
| D384,971 S | 10/1997 | Kawan | 5,900,954 A | 5/1999 | Katz et al. |
| 5,675,342 A | 10/1997 | Sharpe | 5,903,830 A | 5/1999 | Joao et al. |
| 5,686,920 A | 11/1997 | Hurta et al. | 5,905,798 A | 5/1999 | Nerlikar et al. |
| 5,691,731 A | 11/1997 | vanErven | 5,912,678 A | 6/1999 | Saxena et al. |
| 5,692,132 A | 11/1997 | Hogan | 5,920,628 A | 7/1999 | Indeck et al. |
| 5,696,913 A | 12/1997 | Gove et al. | 5,928,788 A | 7/1999 | Riedl |
| 5,697,649 A | 12/1997 | Dames et al. | 5,929,801 A | 7/1999 | Aslanidis et al. |
| 5,698,837 A | 12/1997 | Furuta | 5,931,917 A | 8/1999 | Nguyen et al. |
| 5,699,528 A | 12/1997 | Hogan | 5,932,870 A | 8/1999 | Berson |
| 5,700,037 A | 12/1997 | Keller | 5,933,624 A | 8/1999 | Balmer |
| 5,701,127 A | 12/1997 | Sharpe | 5,943,624 A | 8/1999 | Fox et al. |
| 5,704,046 A | 12/1997 | Hogan | 5,948,116 A | 9/1999 | Aslanidis et al. |
| 5,705,798 A | 1/1998 | Tarbox | 5,953,512 A | 9/1999 | Cai et al. |
| 5,720,500 A | 2/1998 | Okazaki et al. | 5,955,717 A | 9/1999 | Vanstone |
| 5,721,781 A | 2/1998 | Deo et al. | 5,955,969 A | 9/1999 | d'Hont |
| 5,729,053 A | 3/1998 | Orthmann | 5,956,024 A | 9/1999 | Strickland et al. |
| 5,729,236 A | 3/1998 | Flaxl | 5,963,924 A | 10/1999 | Williams et al. |
| 5,731,957 A | 3/1998 | Brennan | 5,970,148 A | 10/1999 | Meier |
| 5,732,579 A | 3/1998 | d'Hont et al. | 5,971,276 A | 10/1999 | Sano et al. |
| 5,748,137 A | 5/1998 | d'Hont | RE36,365 E | 11/1999 | Levine et al. |
| 5,748,737 A | 5/1998 | Daggar | 5,978,348 A | 11/1999 | Tamura |
| 5,758,195 A | 5/1998 | Balmer | 5,978,840 A | 11/1999 | Nguyen et al. |
| 5,761,306 A | 6/1998 | Lewis | 5,983,208 A | 11/1999 | Haller |
| 5,761,493 A | 6/1998 | Blakeley et al. | 5,987,140 A | 11/1999 | Rowney et al. |
| 5,768,609 A | 6/1998 | Gove et al. | 5,987,155 A | 11/1999 | Dunn et al. |
| 5,769,457 A * | 6/1998 | Warther ............ 283/61 | 5,987,498 A | 11/1999 | Athing et al. |
| 5,774,882 A | 6/1998 | Keen et al. | 5,989,950 A | 11/1999 | Wu |
| 5,777,903 A | 7/1998 | Piosenka | 5,991,608 A | 11/1999 | Leyten |
| 5,778,067 A | 7/1998 | Jones et al. | 5,991,750 A | 11/1999 | Watson |
| 5,785,680 A | 7/1998 | Niezink et al. | 5,996,076 A | 11/1999 | Rowney et al. |
| 5,786,587 A | 7/1998 | Colgate, Jr. | 6,002,438 A | 12/1999 | Hocevar et al. |
| 5,789,733 A | 8/1998 | Jachimowicz et al. | 6,002,767 A | 12/1999 | Kramer |
| 5,792,337 A | 8/1998 | Padovani et al. | 6,003,014 A | 12/1999 | Lee et al. |
| 5,793,324 A | 8/1998 | Aslanidis et al. | 6,005,942 A | 12/1999 | Chan et al. |
| 5,794,095 A | 8/1998 | Thompson | 6,006,216 A | 12/1999 | Griffin et al. |
| 5,797,060 A | 8/1998 | Thompson | 6,012,049 A | 1/2000 | Kawan |
| 5,797,085 A | 8/1998 | Beuk et al. | 6,014,645 A | 1/2000 | Cunningham |
| 5,797,133 A | 8/1998 | Jones et al. | 6,018,717 A | 1/2000 | Lee et al. |
| 5,798,709 A | 8/1998 | Flaxl | 6,024,286 A | 2/2000 | Bradley et al. |
| 5,808,758 A | 9/1998 | Solmsdorf | 6,029,149 A | 2/2000 | Dykstra et al. |
| 5,809,142 A | 9/1998 | Hurta et al. | 6,038,584 A | 3/2000 | Balmer |
| 5,809,288 A | 9/1998 | Balmer | 6,047,888 A | 4/2000 | Dethloff |
| 5,809,633 A | 9/1998 | Mundigl et al. | 6,052,675 A | 4/2000 | Checchio |
| 5,825,007 A | 10/1998 | Jesadanont | 6,064,320 A | 5/2000 | d'Hont et al. |
| 5,825,302 A | 10/1998 | Stafford | 6,070,003 A | 5/2000 | Gove et al. |
| 5,826,077 A | 10/1998 | Blakeley et al. | 6,072,870 A | 6/2000 | Nguyen et al. |
| 5,828,044 A | 10/1998 | Jun et al. | 6,073,840 A | 6/2000 | Marion |
| 5,834,756 A | 11/1998 | Gutman et al. | 6,078,888 A | 6/2000 | Johnson, Jr. |
| 5,841,364 A | 11/1998 | Hagl et al. | RE36,788 E | 7/2000 | Mansvelt et al. |
| 5,842,088 A | 11/1998 | Thompson | 6,088,686 A | 7/2000 | Walker et al. |
| 5,844,218 A | 12/1998 | Kawan et al. | 6,092,057 A | 7/2000 | Zimmerman et al. |
| 5,844,230 A | 12/1998 | Lalonde | 6,101,174 A | 8/2000 | Langston |
| 5,845,267 A | 12/1998 | Ronen | 6,102,162 A | 8/2000 | Teicher |
| 5,851,149 A | 12/1998 | Xidos et al. | 6,102,672 A | 8/2000 | Woollenweber et al. |
| 5,854,891 A | 12/1998 | Postlewaite et al. | 6,105,008 A | 8/2000 | Davis et al. |
| 5,856,048 A | 1/1999 | Tahara et al. | 6,105,013 A | 8/2000 | Curry et al. |
| 5,857,709 A | 1/1999 | Chock | 6,105,865 A | 8/2000 | Hardesty |
| 5,858,006 A | 1/1999 | Van der AA et al. | 6,109,525 A | 8/2000 | Blomqvist et al. |
| 5,859,779 A | 1/1999 | Giordano et al. | 6,112,152 A | 8/2000 | Tuttle |
| 5,864,323 A | 1/1999 | Berthon | 6,115,360 A | 9/2000 | Quay et al. |
| 5,867,100 A | 2/1999 | d'Hont | 6,116,423 A | 9/2000 | Troxtell, Jr. et al. |
| 5,870,031 A | 2/1999 | Kaiser et al. | 6,116,505 A | 9/2000 | Withrow |
| 5,870,915 A | 2/1999 | d'Hont | 6,118,189 A | 9/2000 | Flaxl |
| D406,861 S | 3/1999 | Leedy, Jr. | 6,121,544 A | 9/2000 | Petsinger |
| 5,878,215 A | 3/1999 | Kling et al. | 6,123,223 A | 9/2000 | Watkins |
| 5,878,403 A | 3/1999 | DeFrancesco et al. | 6,129,274 A | 10/2000 | Suzuki |
| 5,880,675 A | 3/1999 | Trautner | 6,133,834 A | 10/2000 | Eberth et al. |

| | | | | | | |
|---|---|---|---|---|---|---|
| 6,138,913 | A | 10/2000 | Cyr et al. | 6,490,443 | B1 | 12/2002 | Freeny, Jr. |
| 6,141,651 | A | 10/2000 | Riley et al. | 6,491,229 | B1 | 12/2002 | Berney |
| 6,155,168 | A | 12/2000 | Sakamoto | 6,494,380 | B1 | 12/2002 | Jarosz |
| 6,167,236 | A | 12/2000 | Kaiser et al. | 6,507,762 | B1 | 1/2003 | Amro et al. |
| 6,177,860 | B1 | 1/2001 | Cromer et al. | 6,510,983 | B1 | 1/2003 | Horowitz et al. |
| 6,179,205 | B1 | 1/2001 | Sloan | 6,510,998 | B1 | 1/2003 | Stanford et al. |
| 6,179,206 | B1 | 1/2001 | Matsumori | 6,513,015 | B1 | 1/2003 | Ogasawara |
| 6,188,994 | B1 | 2/2001 | Egendorf | 6,529,880 | B1 | 3/2003 | McKeen et al. |
| 6,192,255 | B1 | 2/2001 | Lewis et al. | 6,535,726 | B1 | 3/2003 | Johnson |
| 6,196,465 | B1 | 3/2001 | Awano | 6,546,373 | B1 | 4/2003 | Cerra |
| 6,198,728 | B1 | 3/2001 | Hulyalkar et al. | 6,547,133 | B1 | 4/2003 | DeVries, Jr. et al. |
| 6,198,875 | B1 | 3/2001 | Edenson et al. | 6,549,912 | B1 | 4/2003 | Chen |
| 6,202,927 | B1 | 3/2001 | Bashan et al. | 6,560,581 | B1 | 5/2003 | Fox et al. |
| 6,205,151 | B1 | 3/2001 | Quay et al. | 6,577,229 | B1 | 6/2003 | Bonneau et al. |
| 6,206,293 | B1 | 3/2001 | Gutman et al. | 6,578,768 | B1 | 6/2003 | Binder et al. |
| 6,215,437 | B1 | 4/2001 | Schurmann et al. | 6,581,839 | B1 | 6/2003 | Lasch et al. |
| 6,216,219 | B1 | 4/2001 | Cai et al. | 6,588,660 | B1 | 7/2003 | Buescher et al. |
| 6,219,439 | B1 | 4/2001 | Burger | 6,589,119 | B1 | 7/2003 | Orus et al. |
| D442,627 | S | 5/2001 | Webb et al. | 6,608,995 | B1 | 8/2003 | Kawasaki et al. |
| D442,629 | S | 5/2001 | Webb et al. | 6,609,655 | B1 | 8/2003 | Harrell |
| 6,223,984 | B1 | 5/2001 | Renner et al. | 6,626,356 | B1 | 9/2003 | Davenport et al. |
| 6,226,382 | B1 | 5/2001 | M'Raihi et al. | 6,628,961 | B1 | 9/2003 | Ho et al. |
| 6,230,270 | B1 | 5/2001 | Laczko, Sr. | 6,650,887 | B1 | 11/2003 | McGregor et al. |
| 6,232,917 | B1 | 5/2001 | Baumer et al. | 6,665,405 | B1 | 12/2003 | Lenstra |
| 6,233,683 | B1 | 5/2001 | Chan et al. | 6,674,786 | B1 | 1/2004 | Nakamura et al. |
| 6,237,848 | B1 | 5/2001 | Everett | 6,679,427 | B1 | 1/2004 | Kuroiwa |
| 6,239,675 | B1 | 5/2001 | Flaxl | 6,684,269 | B1 | 1/2004 | Wagner |
| 6,240,187 | B1 | 5/2001 | Lewis | 6,687,714 | B1 | 2/2004 | Kogen et al. |
| 6,248,314 | B1 | 6/2001 | Nakashimada et al. | 6,690,930 | B1 | 2/2004 | Dupre |
| 6,255,031 | B1 | 7/2001 | Yao et al. | 6,693,513 | B1 | 2/2004 | Tuttle |
| 6,257,486 | B1 | 7/2001 | Teicher et al. | 6,705,530 | B1 | 3/2004 | Kiekhaefer |
| 6,259,769 | B1 | 7/2001 | Page | 6,711,262 | B1 | 3/2004 | Watanen |
| 6,260,026 | B1 | 7/2001 | Tomida et al. | 6,732,936 | B1 | 5/2004 | Kiekhaefer |
| 6,260,088 | B1 | 7/2001 | Gove et al. | 6,742,120 | B1 | 5/2004 | Markakis et al. |
| 6,264,106 | B1 | 7/2001 | Bridgelall | 6,760,581 | B1 | 7/2004 | Dutta |
| 6,266,754 | B1 | 7/2001 | Laczko, Sr. et al. | 6,789,012 | B1 | 9/2004 | Childs et al. |
| 6,273,335 | B1 | 8/2001 | Sloan | 2001/0013542 | A1 | 8/2001 | Horowitz et al. |
| 6,277,232 | B1 | 8/2001 | Wang et al. | 2001/0024157 | A1 | 9/2001 | Hansmann et al. |
| 6,282,522 | B1 | 8/2001 | Davis et al. | 2001/0034565 | A1 | 10/2001 | Leatherman |
| D447,515 | S | 9/2001 | Faenza, Jr. et al. | 2001/0039617 | A1 | 11/2001 | Buhrlen et al. |
| 6,286,763 | B1 | 9/2001 | Reynolds et al. | 2002/0011519 | A1 | 1/2002 | Shults |
| 6,289,324 | B1 | 9/2001 | Kawan | 2002/0028704 | A1 | 3/2002 | Bloomfield et al. |
| 6,290,137 | B1 | 9/2001 | Kiekhaefer | 2002/0035548 | A1 | 3/2002 | Hogan et al. |
| 6,296,188 | B1 | 10/2001 | Kiekhaefer | 2002/0052839 | A1 | 5/2002 | Takatori |
| 6,315,193 | B1 | 11/2001 | Hogan | 2002/0062284 | A1 | 5/2002 | Kawan |
| 6,317,721 | B1 | 11/2001 | Hurta et al. | 2002/0074398 | A1 | 6/2002 | Lancos et al. |
| 6,318,636 | B1 | 11/2001 | Reynolds et al. | 2002/0077837 | A1 | 6/2002 | Krueger et al. |
| 6,323,566 | B1 | 11/2001 | Meier | 2002/0077895 | A1 | 6/2002 | Howell |
| 6,325,285 | B1 | 12/2001 | Baratelli | 2002/0077992 | A1 | 6/2002 | Tobin |
| 6,326,934 | B1 | 12/2001 | Kinzie | 2002/0079367 | A1 | 6/2002 | Montani |
| 6,342,844 | B1 | 1/2002 | Rozin | 2002/0092914 | A1 | 7/2002 | Pentz et al. |
| 6,364,208 | B1 | 4/2002 | Stanford et al. | 2002/0095343 | A1 | 7/2002 | Barton et al. |
| 6,367,011 | B1 | 4/2002 | Lee et al. | 2002/0095389 | A1 | 7/2002 | Gaines |
| 6,374,245 | B1 | 4/2002 | Park | 2002/0095587 | A1 | 7/2002 | Doyle et al. |
| 6,377,034 | B1 | 4/2002 | Ivanov | 2002/0097144 | A1 | 7/2002 | Collins et al. |
| 6,388,533 | B1 | 5/2002 | Swoboda | 2002/0107007 | A1 | 8/2002 | Gerson |
| 6,390,375 | B1 | 5/2002 | Kayanakis | 2002/0107742 | A1 | 8/2002 | Magill |
| 6,400,272 | B1 | 6/2002 | Holtzman et al. | 2002/0109580 | A1 | 8/2002 | Shreve et al. |
| 6,402,028 | B1 | 6/2002 | Graham, Jr. et al. | 2002/0111210 | A1 | 8/2002 | Luciano, Jr. et al. |
| 6,411,611 | B1 | 6/2002 | van der Tuijn | 2002/0113082 | A1 | 8/2002 | Leatherman et al. |
| 6,415,978 | B1 | 7/2002 | McAllister | 2002/0116274 | A1 | 8/2002 | Hind et al. |
| 6,422,464 | B1 | 7/2002 | Terranova | 2002/0120584 | A1 | 8/2002 | Hogan et al. |
| 6,424,029 | B1 | 7/2002 | Giesler | 2002/0126010 | A1 | 9/2002 | Trimble et al. |
| 6,442,532 | B1 | 8/2002 | Kawan | 2002/0131567 | A1 | 9/2002 | Maginas |
| 6,457,996 | B1 | 10/2002 | Shih | 2002/0138438 | A1 | 9/2002 | Bardwell |
| 6,466,804 | B1 | 10/2002 | Pecen et al. | 2002/0140542 | A1 | 10/2002 | Prokoski et al. |
| 6,471,127 | B1 | 10/2002 | Pentz et al. | 2002/0145043 | A1 | 10/2002 | Challa et al. |
| 6,473,500 | B1 | 10/2002 | Risafi et al. | 2002/0147913 | A1 | 10/2002 | Lun Yip |
| 6,480,100 | B1 | 11/2002 | Frieden et al. | 2002/0148892 | A1 | 10/2002 | Bardwell |
| 6,480,101 | B1 | 11/2002 | Kelly et al. | 2002/0152123 | A1 | 10/2002 | Giordano et al. |
| 6,481,621 | B1 | 11/2002 | Herrendoerfer et al. | 2002/0166891 | A1 | 11/2002 | Stoutenburg et al. |
| 6,481,632 | B1 | 11/2002 | Wentker et al. | 2002/0176522 | A1 | 11/2002 | Fan |
| 6,484,937 | B1 | 11/2002 | Devaux et al. | 2002/0178063 | A1 | 11/2002 | Gravelle et al. |

| | | | | | |
|---|---|---|---|---|---|
| 2002/0178369 A1 | 11/2002 | Black | EP | 0 956 818 A1 | 11/1999 |
| 2002/0185543 A1 | 12/2002 | Pentz et al. | EP | 0 959 440 A2 | 11/1999 |
| 2002/0188501 A1 | 12/2002 | Lefkowith | EP | 0 984 404 A2 | 3/2000 |
| 2002/0190125 A1 | 12/2002 | Stockhammer | EP | 1 016 947 A2 | 7/2000 |
| 2002/0194303 A1 | 12/2002 | Stuila et al. | EP | 1 039 403 A2 | 9/2000 |
| 2002/0194503 A1 | 12/2002 | Faith et al. | EP | 1 104 909 A2 | 6/2001 |
| 2002/0196963 A1 | 12/2002 | Bardwell | EP | 1 113 387 A2 | 7/2001 |
| 2003/0009382 A1 | 1/2003 | D'Arbelott et al. | EP | 1199684 | 4/2002 |
| 2003/0014307 A1 | 1/2003 | Heng | EP | 1 251 450 A1 | 10/2002 |
| 2003/0014357 A1 | 1/2003 | Chrisekos et al. | GB | 1371254 | 10/1974 |
| 2003/0014891 A1 | 1/2003 | Nelms et al. | GB | 2108906 | 5/1985 |
| 2003/0018532 A1 | 1/2003 | Dudek et al. | GB | 2240948 | 8/1991 |
| 2003/0025600 A1 | 2/2003 | Blanchard | GB | 2347537 | 9/2000 |
| 2003/0046228 A1 | 3/2003 | Berney | JP | 62-264999 | 11/1987 |
| 2003/0057278 A1 | 3/2003 | Wong | JP | 63-071794 | 4/1988 |
| 2003/0069828 A1 | 4/2003 | Blazey et al. | JP | 63-098689 | 4/1988 |
| 2003/0069846 A1 | 4/2003 | Marcon | JP | 63-072721 | 5/1988 |
| 2003/0120554 A1 | 6/2003 | Hogan et al. | JP | 63-175987 | 7/1988 |
| 2003/0121969 A1 | 7/2003 | Wankmueller | JP | 64-4934 | 1/1989 |
| 2003/0132284 A1 | 7/2003 | Reynolds et al. | JP | 64-087395 | 3/1989 |
| 2003/0140228 A1 | 7/2003 | Binder | JP | 64-087396 | 3/1989 |
| 2003/0163699 A1 | 8/2003 | Pailles et al. | JP | 64-087397 | 3/1989 |
| 2003/0167207 A1 | 9/2003 | Berardi et al. | JP | 62-43774 | 2/1990 |
| 2003/0177347 A1 | 9/2003 | Schneier et al. | JP | 02-130737 | 5/1990 |
| 2003/0183689 A1 | 10/2003 | Swift et al. | JP | 02-252149 | 10/1990 |
| 2003/0183699 A1 | 10/2003 | Masui | JP | 03-290780 | 12/1991 |
| 2003/0187786 A1 | 10/2003 | Swift et al. | JP | 04-303692 | 10/1992 |
| 2003/0187787 A1 | 10/2003 | Freund | JP | 05-069689 | 3/1993 |
| 2003/0187790 A1 | 10/2003 | Swift et al. | JP | 05-254283 | 10/1993 |
| 2003/0187796 A1 | 10/2003 | Swift et al. | JP | 06-183187 | 7/1994 |
| 2003/0195842 A1 | 10/2003 | Reece | JP | 06-191137 | 7/1994 |
| 2003/0195843 A1 | 10/2003 | Matsuda et al. | JP | 06-234287 | 8/1994 |
| 2003/0200184 A1 | 10/2003 | Dominguez et al. | JP | 07-173358 | 7/1995 |
| 2003/0218066 A1 | 11/2003 | Fernandes et al. | JP | 07-205569 | 8/1995 |
| 2003/0220876 A1 | 11/2003 | Burger et al. | JP | 09-52240 | 2/1997 |
| 2003/0222153 A1 | 12/2003 | Pentz et al. | JP | 09-274640 | 10/1997 |
| 2003/0225623 A1 | 12/2003 | Wankmueller | JP | 10-129161 | 5/1998 |
| 2003/0225713 A1 | 12/2003 | Atkinson et al. | JP | 11-227367 | 8/1999 |
| 2003/0227550 A1 | 12/2003 | Manico et al. | JP | 2000-11109 | 1/2000 |
| 2003/0233334 A1 | 12/2003 | Smith | JP | 2000015288 A | 1/2000 |
| 2004/0010462 A1 | 1/2004 | Moon et al. | JP | 2000-40181 A | 2/2000 |
| 2004/0015451 A1 | 1/2004 | Sahota et al. | JP | 200067312 A | 3/2000 |
| 2004/0029569 A1 | 2/2004 | Khan et al. | JP | 2000-177229 | 6/2000 |
| 2004/0039860 A1 | 2/2004 | Mills et al. | JP | 2000207641 A | 7/2000 |
| 2004/0139021 A1 | 7/2004 | Reed et al. | JP | 2001-504406 | 4/2001 |
| | | | JP | 2001283122 A | 10/2001 |
| FOREIGN PATENT DOCUMENTS | | | JP | 2001-315475 | 11/2001 |
| CH | 689680 | 8/1999 | JP | 2002-274087 | 9/2002 |
| DE | 2847756 | 5/1980 | WO | WO 81/00776 | 3/1981 |
| EP | 0181770 | 5/1986 | WO | WO 89/03760 | 5/1989 |
| EP | 0343829 | 11/1989 | WO | WO 90/08661 | 8/1990 |
| EP | 0354817 | 2/1990 | WO | WO 92/16913 | 10/1992 |
| EP | 0 358 525 A2 | 3/1990 | WO | WO 95/32919 | 12/1995 |
| EP | 0368570 | 5/1990 | WO | WO 96/18972 | 6/1996 |
| EP | 0388090 | 9/1990 | WO | WO 99/03057 | 1/1999 |
| EP | 0 424 726 A1 | 10/1990 | WO | WO 99/14055 | 3/1999 |
| EP | 0403134 | 12/1990 | WO | WO 99/47983 | 9/1999 |
| EP | 0411602 | 2/1991 | WO | WO 01/15098 | 3/2001 |
| EP | 0473998 | 3/1992 | WO | WO 01/43095 | 6/2001 |
| EP | 0481388 | 4/1992 | WO | WO 01/72224 | 10/2001 |
| EP | 0531605 | 3/1993 | WO | WO 01/77856 | 10/2001 |
| EP | 0552047 | 7/1993 | WO | WO 01/80473 | 10/2001 |
| EP | 0560318 | 9/1993 | WO | WO 01/86535 | 11/2001 |
| EP | 0568185 | 11/1993 | WO | WO 01/90962 | 11/2001 |
| EP | 0657297 | 6/1995 | WO | WO 01/95243 | 12/2001 |
| EP | 0721850 | 7/1996 | WO | WO 02/01484 | 1/2002 |
| EP | 0780839 | 6/1997 | WO | WO 02/13134 | 2/2002 |
| EP | 0789316 | 8/1997 | WO | WO 02/063545 | 8/2002 |
| EP | 0866420 | 9/1998 | WO | WO 02/065246 | 8/2002 |
| EP | 0894620 | 2/1999 | WO | WO 02/065404 | 8/2002 |
| EP | 0916519 | 5/1999 | WO | WO 02/069221 | 9/2002 |
| EP | 0 933 717 A2 | 8/1999 | WO | WO 02/073512 | 9/2002 |
| | | | WO | WO 02/086665 | 10/2002 |

| | | |
|---|---|---|
| WO | WO 02/091281 | 11/2002 |
| WO | WO 02/097575 | 12/2002 |
| WO | WO 02/101670 | 12/2002 |
| WO | WO 03/007623 | 1/2003 |

OTHER PUBLICATIONS

"Physical Reality: A Second Look", Ken Sharp, Senior Technical Editor, http://www.idsystems.com/reader/1999_03/phys0399_pt2/phys0399_pt2.htm ( 6 pages).

"Magic Wands to Speed Mobile Sales", BobBrewin, Jan. 15, 2001, http://www.computerworld.com/mobiletopics/mobile/story/1,10801,563300.html ( 4 pages).

"Mobile Speedpass Goes GLobal as Mobil Singapore Rolls Out Asia's First RFID-Based Pay-At-The-Pump System", Press Release, Apr. 5, 1999, http://www.www.ti.com/tiris/docs/news_releases/rell2.htm ( 3 pages).

"Speedpass Unleashed", Jun. 4, 2002, http://www.cardweb.com/cardtrak/news/cf2_20a_97.html (2 pages).

Prophecy Central Update #9, Oct. 10, 1997, http://www.bible-prophecy.com/pcu9.htm (5 pages).

International newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hm/xml/03/01/030110hnsport.xml?s=IDGNS (3 pages).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to tests its QuickWave RFID payment card for another three months", RFID Journal, Jan. 23, 2003.

MasterCard to Test RFID Card: Pilot will test whether consumers, merchants and credit card issuers value "contactless payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a New RFID standard for payments and for communication between devices", RFID Jornal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has released a Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instruments ISO 14443 payment platform promises faster data transfer rates and more security", RFID Journal, Mar. 6, 2003.

Multiple Frequency Transponders: "Volume production of dual-band RFID chips begins", Frontline Solutions, Jul. 16, 2003.

Functional Specification, Standard Card IC MF1 IC S50, Phillips Semiconductors, Product Specification Rev. 5.1 May 2001.

"Microsoft: See SPOT Run on Your Wrist", by Richard Shim, Jun. 5, 2003, http://news.com.com/2102-1041_3-1013442.html?tag=st.util.print.

"Binder," Wordnet 1.6, 1997 Princeton University.

* cited by examiner

SYSTEM AND METHOD FOR MANUFACTURING A PUNCH-OUT RFID TRANSACTION DEVICE

CROSS REFERENCE TO RELATED APPLICATIONS

This invention is a continuation-in-part of and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001). This invention is also a continuation-in-part of and claims priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002). This invention is also a continuation-in-part of U.S. patent application Ser. No. 10/394,914, entitled "TRANSACTION CARD," filed Mar. 21, 2003 (which itself claims priority to U.S. Provisional Patent Application No. 60/153,112, filed Sep. 7, 1999, U.S. Provisional Patent Application No. 60/167,405, filed Nov. 24, 1999, and to U.S. Provisional Patent Application No. 60/171,689, filed Dec. 21, 1999), and is also a continuation-in-part of U.S. Patent Application No. 10/302,658, entitled "TRANSACTION CARD WITH DUAL IC CHIPS," filed Nov. 22, 2002 now abandoned, both of which claim priority to U.S. patent application Ser. No. 10/092,681, entitled "TRANSACTION CARD," filed Mar. 7, 2002 (which itself claims priority to U.S. Provisional Patent Application No. 60/153,112, filed Sep. 7, 1999, U.S. Provisional Patent Application No. 60/160,519, filed Oct. 20, 1999, U.S. Provisional Patent Application No. 60/167,405, filed Nov. 24, 1999, and to U.S. Provisional Patent Application No. 60/171,689, filed Dec. 21, 1999), which claims priority to U.S. patent application Ser. No. 10/062,106, entitled "TRANSACTION CARD," filed Jan. 31, 2002, the entire contents of which are hereby incorporated by reference.

FIELD OF INVENTION

The present invention generally relates to transaction devices, and more particularly, to a system and method for fabricating a Radio Frequency operable transaction device which may be included in any form factor.

BACKGROUND OF INVENTION

As such, recent years has seen the development of transaction cards, such as credit cards, debit cards, smart cards, pre-paid cards, and the like, as a popular substitute for cash or personal checks. Initial transaction cards were typically restricted to select restaurants and hotels and were often limited to an exclusive class of individuals. The initial cards were difficult to store during long periods of extended use, since the initial cards were constructed of a soft easily alterable paper. As such, transaction card manufacturers began forming transaction cards from more durable material such as plastic.

With the advent of plastic credit cards, the use of transaction cards has rapidly increased world-wide. Transaction cards are now more readily available to the average consumer. The average consumer often prefers the transaction cards over traditional currency since the transaction card may be easily replaced by the card issuer if the user loses or misplaces the card or the card is stolen.

Transaction cards typically allow a consumer to pay for goods and services without the need to constantly possess cash. Alternatively, if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually.

The vast number of cards produced demands international standards for card dimensions (e.g., length, width, thickness, shape). For example, the International Standardization Organization ("ISO") standardizes a transaction card's dimensions under standard ISO/IEC 7812, a standard which is accepted by all transaction card manufacturers industry wide. As such, the machines used to manufacture transaction cards vary little from one transaction card manufacture to another, in order that each manufacturer conforms to the industry standard.

As the number of transaction cards issued increases, so do the security issues surrounding transaction card transactions. Security concerns such as, fraudulent charges, credits, merchant settlement, and reimbursements, etc., have increased due to the increasing use of transaction cards. As a consequence, the transaction card industry started to develop more sophisticated transaction cards which allowed for the reading, transmission, and authorization of transaction card data, while lessening the elevating security concerns.

For example, many transaction card manufacturers are providing alternative transaction devices capable of being used in place of traditional transaction cards. Initially, the replacement transaction devices where manufactured in the form of smart cards, which were capable of transferring user information without the user every having to lose physical control of the device. Thus, smart cards enhance the security of the transactions by virtually eliminating the need for the user to hand the card over to a merchant salesperson for transaction completion.

While the advent of smart cards helped to alleviate some of the security issues surrounding transaction devices, smart cards did little to address fraud issues associated with a lost or stolen transaction card. This is true because the smart cards where manufactured with the same size dimensions as traditional transaction cards and, therefore, the user did little more to secure the smart card against loss than the user did to secure a traditional credit card, for example. More particularly, while the identical size dimensions between the traditional transaction card and the smart card has the cost advantage associated with permitting a card manufacturer to manufacture smart cards on traditional transaction card fabrication machinery, the disadvantage is that the smart card was still subject to similar theft and fraud concerns as a traditional card since smart card users typically would lose or misplace the smart card with similar frequency as with a traditional transaction card.

Thus, to alleviate the fraud cost associated with a lost or stolen transaction device, transaction card providers are searching for suitable technology which would permit a transaction to be completed without the cardholder having to relinquish control of the card, and which would provide increased means of securing the transaction device. One such technology is radio frequency identification (RFID) technology.

Like barcode and voice data entry, RFID is a contactless information acquisition technology. RFID systems are wireless, and are usually extremely effective in hostile environments where conventional acquisition methods fail.

In general, RFID technology permits a card manufacturer to provide for a dimensionally smaller transaction device than a smart card or traditional transaction card. RFID technology, therefore, is better suited for securing against loss or theft. For example, the RFID technology may be embodied in a form factor attachable to the account holder's person or to an often used (or often handled) personal article, such as a key chain, fob or tag. The RFID transaction device may be attached to the personal article in an unobtrusive manner because of its smaller size. As such, the user has increased security against loss or theft, since the user handles the personal article frequently, permitting the user to repeatedly be reminded that the card is present.

One of the more visible transaction device which uses RFID technology is found in the introduction of Exxon/Mobil's Speedpass® and Shell's EasyPay® products, which are attachable to a user's key chain. These products use RFID transponders placed in a fob or tag of irregular shape which enables automatic identification of the user when the fob is presented at a Point of Sale (POS) device. Fob identification data is typically passed to a third party server database, where the identification data is referenced to a customer (e.g., user) credit or debit account for completion of a transaction.

By providing a RFID transaction device (e.g., fob) as described above, transaction account providers are able to attract account users in increasing numbers. The account users often prefer account providers which offer the RFID transaction device option because of the convenience of use and the security using a RF transaction fob provides. As such, because of the increased popularity and benefits associated with RFID transaction devices, many banking and financing institutions, department stores, petroleum companies and other organizations have developed their own RFID transaction devices for use by the organization's consumers.

SUMMARY OF INVENTION

It is, therefore, an object of the present invention to provide a RFID operable transaction device manufacturing system and method which requires little retrofitting of conventional transaction card manufacturing and personalization machinery.

In one embodiment, the present invention relates to a process for producing a RFID operable transaction device, having any one or more features, such as a holographic foil, integrated circuit chip, silver magnetic stripe with text on the magnetic stripe, opacity gradient, perforations included in the transparent device body for forming an outline of a shape, and an "active thru" date on the front of the device.

In one aspect, the RFID transaction device of the present invention may use RFID technology to initiate and complete financial transactions. In that regard, the transaction device may include one or more RFID transponders and antennas in the device body, which are typically included during the transaction device fabrication. The system in which the RFID transaction device may be used may include a RFID reader operable to provide a RF interrogation signal for powering the transaction device transponder system, receiving a transponder system RF signal including transponder system account data, and providing transponder system account data relative to the transponder system RF signal although, the transaction device may include its own internal power source. The RFID reader may include an RFID protocol/sequence controller in communication with one or more interrogators for providing an interrogation signal to a transponder of the transaction device, a RFID authentication circuit for authenticating the signal received from the transponder, and a serial or parallel interface for interfacing with a point of interaction device.

The RFID reader may be configured to send a standing RFID recognition signal which may be continuously or intermittently transmitted from the RFID reader via radio frequency (or electromagnetic) propagation. In one instance, the transaction device may be placed within proximity to the RFID reader such that the RFID recognition signal may interrogate the device and initialize device identification or authorization procedures.

In another aspect of the invention, a transaction device is provided which may be issued to a user in a transaction device transporter wherein the user may remove the transaction device from the transporter for use with any form factor. In one exemplary transaction device manufacturing method, a plurality of transporter and transaction device (called "transaction device combination" herein) is manufactured simultaneously on a single sheet using conventional manufacturing machinery. Each of the plurality of transaction device combinations is manufactured as a removable subpart the sheet of the plurality of transaction device combinations, wherein each combination may be an independent operable RFID payment device, which is ISO/7810-1985 compliant in size. As such, the transaction device combination may be manufactured, stamped, and/or cut using conventional manufacturing equipment.

The transaction device transporter, including the removable transaction device, are manufactured with at least one border of the transaction device transporter directly adjacent a border of the next adjacent transporter, forming a sheet of conjoined transaction device transporters. Preferably, the sheet of transporters is manufactured including RFID operable transaction devices. More preferably, the sheet is manufactured with RFID operable transaction devices including conventional RFID data transmission circuitry.

Once the sheet of transaction device combinations is manufactured, the sheet may then be fed through a stamping device for imprinting an outline of the transaction device (e.g., The sheet may then be cut along the borders of the transaction device transporter into conventional transaction card dimensions, such as, for example, the ISO/IEC 7812 standardized card dimensions noted above. Preferably, the sheet is cut such that the transaction card shaped transaction device combination resulting from the cutting process includes the removable transaction device. The resulting transaction device combination may then be delivered to a transaction device user, who may remove ("punch-out") the removable transaction device from the transaction device transporter by, for example, applying minimal physical force along lines (e.g., alignment lines) defining the shape of the transaction device imprinted on the transporter. Once removed, the RFID transaction device may be used to complete a RF transaction since the transaction device includes the RFID module. Further, the outline of the imprinting may serve to define the shape of the transaction device. The transaction device manufacturer may predetermine the shape of the transaction device and imprint the predetermined shape in the transporter.

In another embodiment, the transaction device may not be removed from the transporter. Instead, the transaction device combination may be left intact. The combination may be used to complete a RFID transaction since the RFID module is included in the transaction device (which is included in the transaction device combination). In this way, the transaction device combination may be used in similar manner as a conventional RFID transaction device to complete a transaction. That is, a user may position the transaction device combination in proximity to a RFID reader. The RFID module may then provide transaction device account information (e.g., account number, user identifier, device identifier) to the reader, which may forward the information to a merchant system or POS for transaction completion.

Alternatively, the transaction device combination may be equipped with a traditional magnetic stripe, which is ordinarily ISO/IEC 7800, et al., compliant. The magnetic stripe may include user account information which may be provided to a conventional magnetic stripe reader for completing a transaction using traditional magnetic stripe data processing methods. Thus, the user may use the transporter and RFID transaction device in similar manner as a traditional credit card or debit card, and the like.

In another exemplary embodiment, the transaction card body is cut and the transaction device outline is imprinted simultaneously. In this instance, the card manufacturer may utilize a cutting machine configured to imprint an outline of the removable transaction device when the cutting of the transporter is performed. In this way, only one machine action is necessary to cut the transporter body and imprint the removable transaction device outline.

In yet another exemplary embodiment, the transaction device includes the RFID module completely contained within the transaction device outline formed by the imprinting action. The transaction device may be formed or shaped using any desired outline. For example, a suitable outline such as an irregularly shaped key fob outline may be pressed (e.g., imprinted) within the perimeter of each of the plurality of transaction device transporters. The transaction device outline may be pressed or imprinted into the transporter such that the RFID module is contained within the transaction device outline. The transaction device may then be "punched out" of ("removed from") the transporter by placing minimal physical force at the transaction device outline, such that the resulting RFID transaction device is shaped in the transaction device outline provided.

In yet another exemplary embodiment of the invention, the transaction device manufacturer may manufacture a transaction device sheet including the RFID module wherein the sheet may be cut in the traditional credit card ISO/IEC 7800 et al. compliant shapes and the transaction device is cut in any shape as desired for a RFID transaction device (e.g., teardrop fob shaped). In this way, a transaction device manufacturer may form both transaction cards and irregularly shaped RFID transaction devices on the same sheet simply by designating the proper design or shape to be made.

In still another aspect, the invention includes a means for securing the transaction device to a user's person or to a user's frequently used personal apparatus. For example, in one particular embodiment, the outline of the transaction device may be shaped to include an opening or aperture for securing the transaction device to, for example, a chain, key ring, ring, watch, rope, or the like. The key ring or chain, for example, may be inserted through the opening to secure the payment device to the chain or key ring to guard against the payment device being easily lost or stolen.

In another exemplary embodiment, the RFID module may be removed from the transaction device for use in completing a transaction independently of the transaction device or the transporter. The outline of the module may additionally be pressed inside a transaction device outline as well, although not required. In this instance, an outline of the RFID module may be imprinted on the transaction device transporter wherein the module is positioned inside the transporter outline. The RFID module outline may be imprinted or pressed into the transporter at sufficient depth to permit the module to be easily removed, in similar manner as discussed with the transaction device. The module may be removed from the transporter using any of the methods described herein.

Once removed, the module may be secured using an independent portable carrier. The portable carrier may be configured to encase a portion of the module and lock the module in place. The carrier, including the module, may include an aperture for securing the carrier to a key ring or chain, as described above. The carrier may be affixed to, or included in, any form factor (e.g., wrist watch, pocket watch, money clip, wrist watch band, cellular phone, etc.). Alternatively, the carrier may be secured in any form factor using any suitable securing means. The desired form factor may include an opening for accepting the module and for securely fixing the module to the form factor. The desired form factor may include means for securing the module alongside or adjacent to the form factor body.

Additional features and advantages of the present invention are described in, and will be apparent from, the detailed description of the present exemplary embodiments and from the drawings.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up cables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the internet, an intranet, an extranet, WAN, LAN, satellite communications, and/or the like. It is noted that the network may be implemented as other types of networks, such as an interactive television network (ITN).

Figure 1:
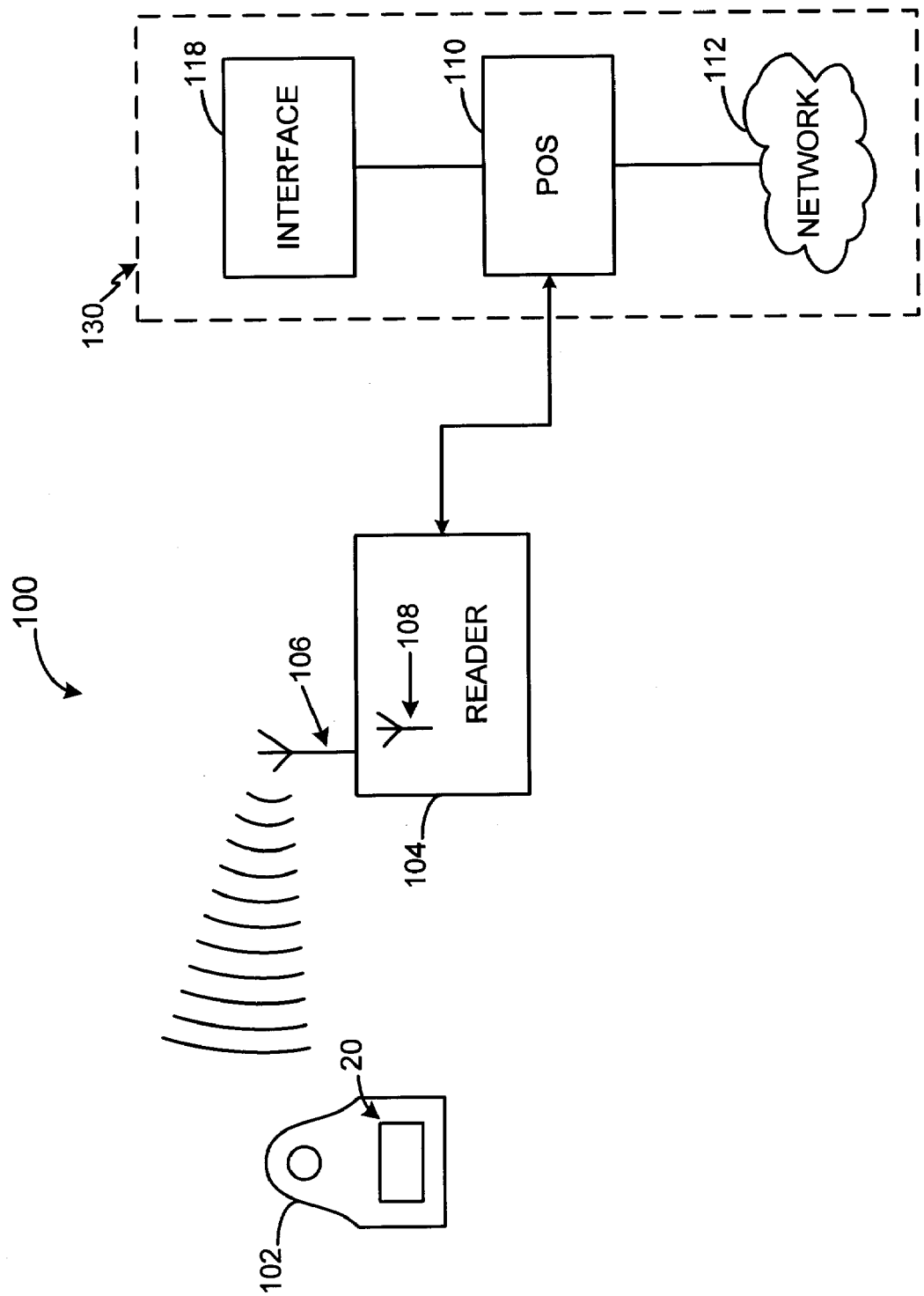
FIG. 1 illustrates an exemplary RFID transaction device system in accordance with an exemplary embodiment of the present invention.

FIG. 1 illustrates an exemplary Radio Frequency (RF) transaction device system 100 for use with the present invention, wherein exemplary components for use in completing a contactless transaction are depicted. In general, the operation of system 100 may begin when a contactless transaction device 102 is presented for payment. The device may be presented for payment by, for example, waiving the device 102 in proximity to a RFID reader 104. The RFID reader 104 provides an interrogation signal for powering the device 102 and the transaction device 102 is positioned in such proximity to the reader 104 that the device 102 may be positioned to be in communication with the transaction device 102 via RF transmission of the interrogation signal. The interrogating signal may power the contactless transaction device 102 thereby initiating operation of the device 102. The contactless transaction device 102 may provide a transponder identifier and/or account identifier to the RFID reader 104, via RF transmissions and the reader 104 may further provide the identifier to the merchant system 130 POS device 110 for transaction completion. Details for the operation of an exemplary RFID transparent system for transaction completion is found in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny which is hereby incorporated by reference.

Although the point of interaction device is described herein with respect to a merchant point of sale (POS) device, the invention is not to be so limited. Indeed, a merchant POS device is used herein by way of example, and the point of interaction device may be any device capable of receiving device account data. In this regard, the POS may be any point of interaction device or transaction device acceptance device enabling the user to complete a transaction using an RF responsive transponder.

The RFID reader 104 may be configured to communicate using a RFID internal antenna 108. Alternatively, RFID reader 104 may include an external antenna 106 where the external antenna 106 may be made remote to the RFID reader 104 using a suitable cable and/or data link. RFID reader 104 may be further in communication with a transaction completion system (e.g., merchant system 130) via a data link. In one exemplary embodiment the transaction completion system may include POS device 110 in communication with a RFID reader 104 (via a data link), and a customer interface 118 in communication with the POS device 110. The POS 110 may be in further communication with an account issuer system (not shown) via a network 112 which may be provided the account number and any transaction identifying information (e.g., time, duty, cost of transaction, item negotiated) for transaction completion.

The terms "Internet" or "network" as used herein, may refer to the Internet, any replacement, competitor or successor to the Internet, or any public or private internetwork, intranet or extranet that is based upon open or proprietary protocols. Specific information related to the protocols, standards, and application software utilized in connection with the Internet may not be discussed herein. For further information regarding such details, see, for example, Dilip Naik, "Internet Standards and Protocols" (1998); "Java 2 Complete", various authors, (Sybex 1999); Deborah Ray and Eric Ray, "Mastering HTML 4.0" (1997); Loshin, "TCP/IP Clearly Explained" (1997). All of these texts are hereby incorporated by reference.

By being in "communication," what is described may be that a signal may travel to/from one component of the invention to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system to complete a transaction via any input device or user interface 118, such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols may be used for the data links. For example, data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. In addition, the merchant system 130, including the POS 110 and host network 112, may reside on a local area network, which interfaces with a remote network (not shown) for remote transaction authorization. Such communications lines are described in a variety of texts, such as, "Understanding Data Communications," by Gilbert Held, which is incorporated herein by reference.

A transaction device account identifier or account number, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard or the like.

Figure 5:
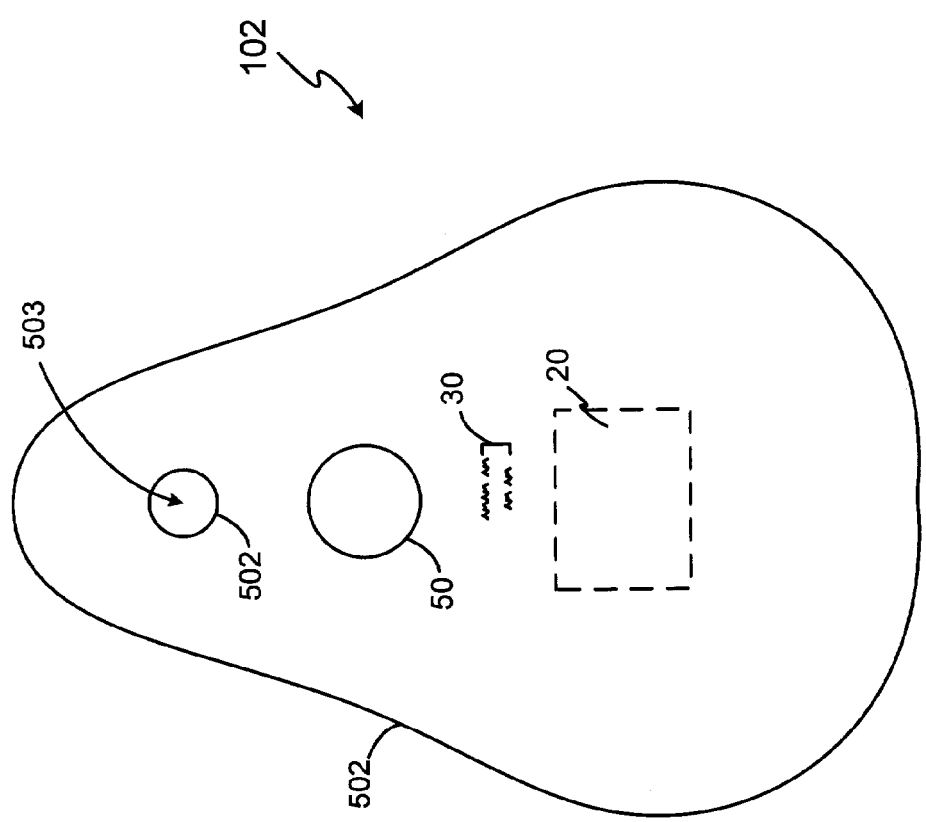
FIG. 5 depicts the front surface of an exemplary RFID transaction device in accordance with an exemplary embodiment of the present invention.
Figure 6:
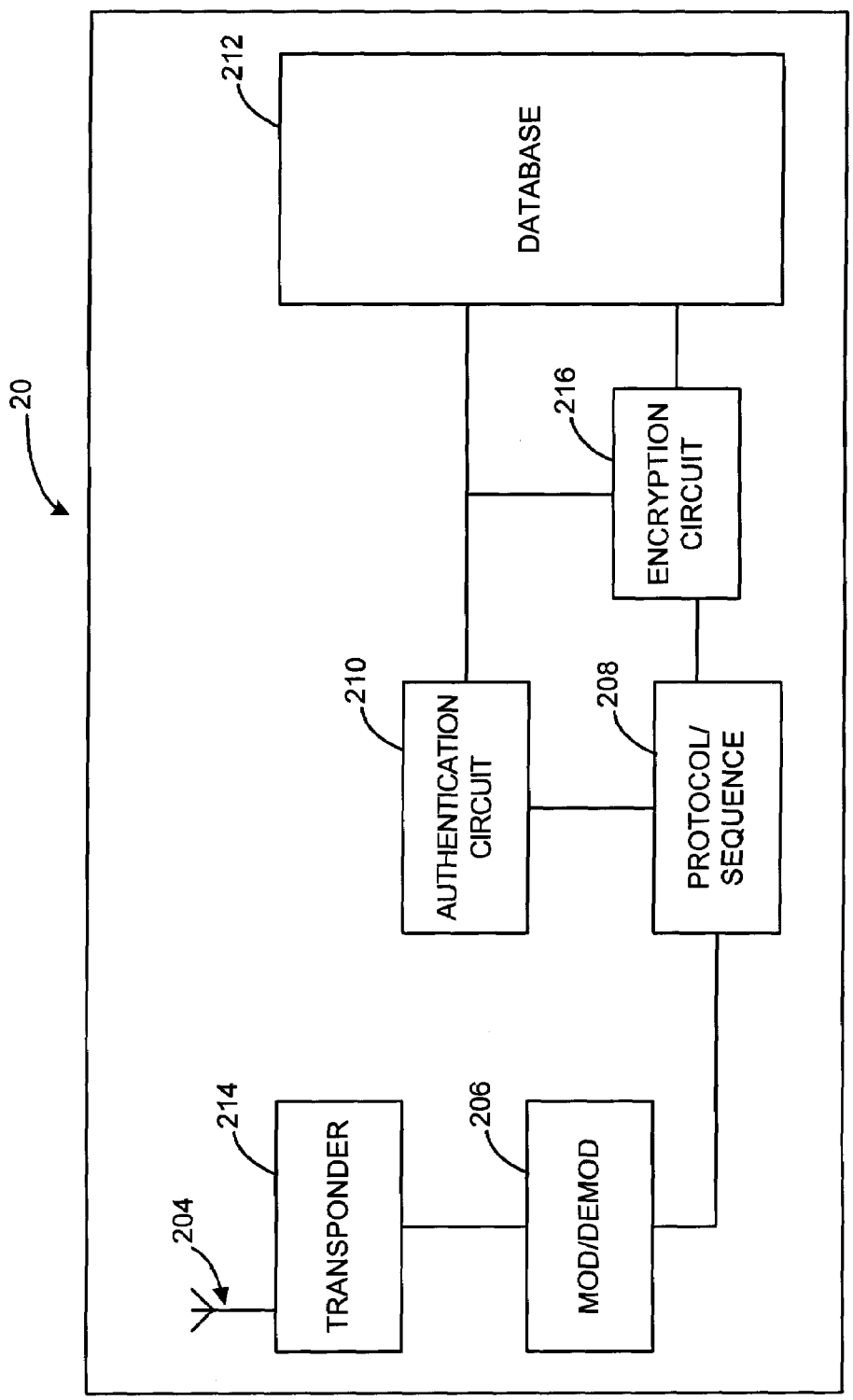
FIG. 6 shows an exemplary RFID module in accordance with an exemplary embodiment of the present invention.

In general, the transaction devices 102 which use the above RF transmission process may take any form. The RFID circuitry 20 may be included in RFID transaction device 12 for use in completing a RFID transaction and the transaction device 102 may take any form as desired. To facilitate understanding of this invention, FIG. 5 illustrates a RFID transaction device 102 shaped as a teardrop shaped transaction device 102, although other shapes are contemplated. FIG. 5 shows an exemplary teardrop shaped RFID transaction device 102, including RFID circuitry 20 for conducting a RF transaction.

The RFID transaction device 102 (described more fully below) may come in many different shapes. Because a typical card manufacturer may provide both traditional credit card shaped transaction cards and irregularly shaped RFID transaction devices, the manufacturer must have proper machinery for cutting sheets of the devices into the appropriate device size. The present invention provides a system and method for forming the irregularly shaped transaction devices, which utilizes conventional dimensional standards for transaction cards (e.g., credit cards, smart cards, etc.) irrespective of the RFID transaction device shape. This, in turn, allows the manufacturer to manufacture irregularly shaped transaction devices using conventional card manufacturing machinery, with little retrofitting. The invention allows for a manufacturer to use coextensive transaction card and RFID transaction device manufacturing processes which produce both transaction devices simultaneously or individually. The process is termed coextensive since identical material layers and/or circuitry may be used whether the card manufacture desires to cut transaction cards or RFID transaction devices.

Figure 2:
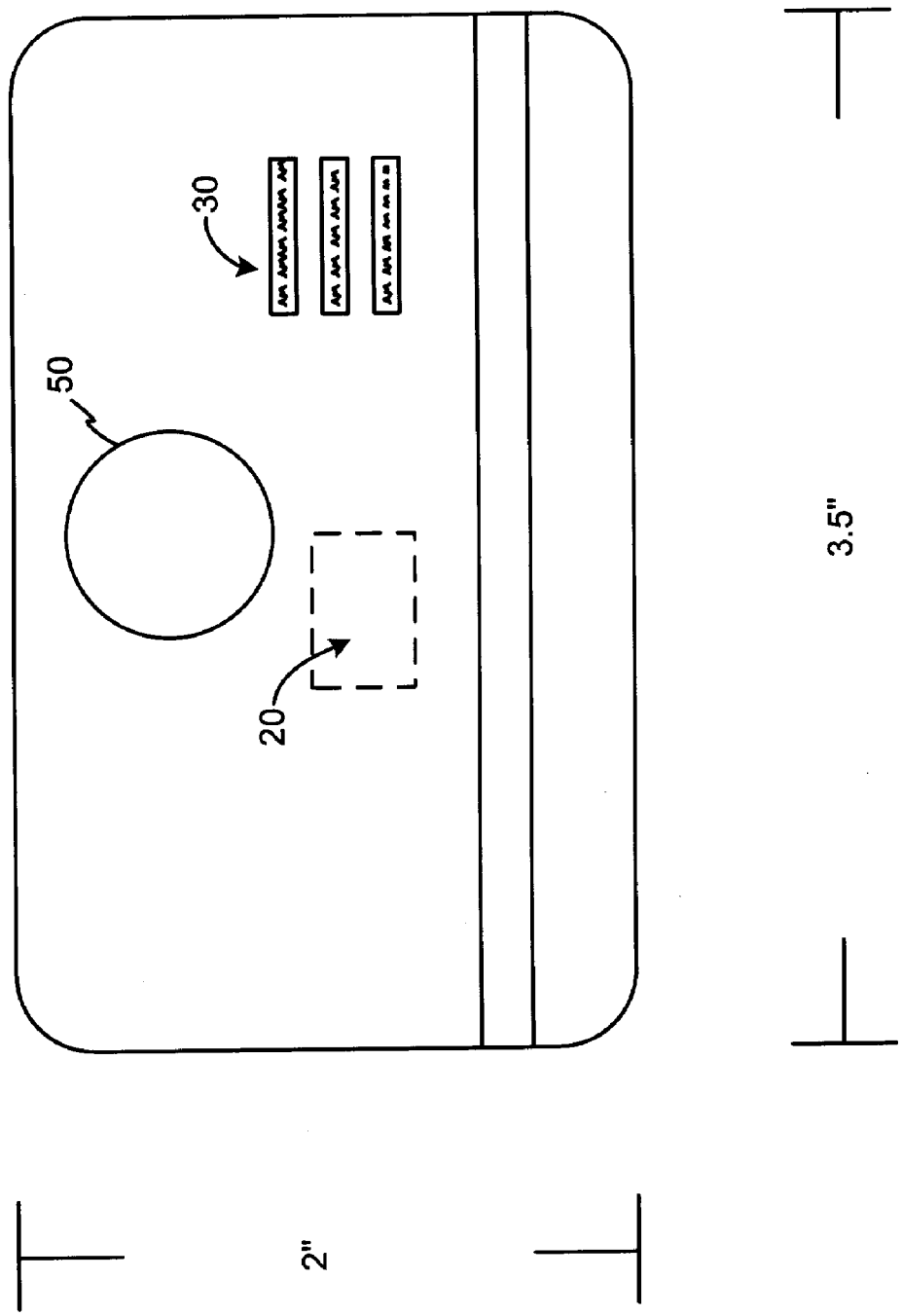
FIG. 2 illustrates an exemplary prior art transaction card in accordance with an exemplary embodiment of the present invention.

FIG. 2 depicts the dimensional relationship of an exemplary transaction card 1. Transaction card 1 is shown with dimensional characteristics which conform to the ISO card size standard, typically ISO/IEC 7800 et al. Generally, transaction card 1 is about 2"×3.5".

Figure 3:
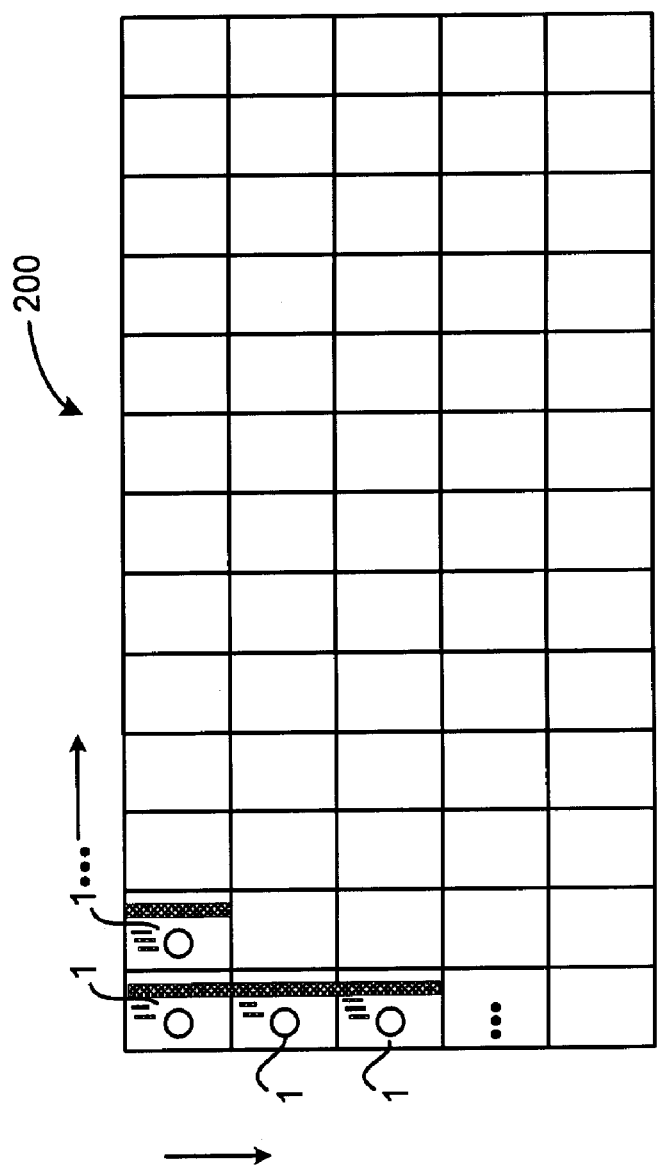
FIG. 3 illustrates an exemplary sheet of plurality of transaction cards in accordance with an exemplary embodiment of the present invention.

Manufacturers of transaction cards 1 take advantage of mass production techniques when manufacturing transaction cards. Instead of producing the cards 1 individually, the cards 1 are produced en masse in sheets 200 which are then cut into the appropriate individual size. FIG. 3 is a depiction of an exemplary sheet 200 of a plurality of transaction cards 1, which may be manufactured using a conventional transaction card manufacturing process.

Sheet 200 may be prepared using any conventional method of manufacturing a sheet of multiple transaction devices 1. The present invention modifies conventional methods by including perforation, impressing and RFID circuitry as discussed below. The following description is an exemplary method of manufacturing sheet 200 according to the invention. The description is offered to facilitate a understanding of the invention and not by way of limitation.

Figure 4:
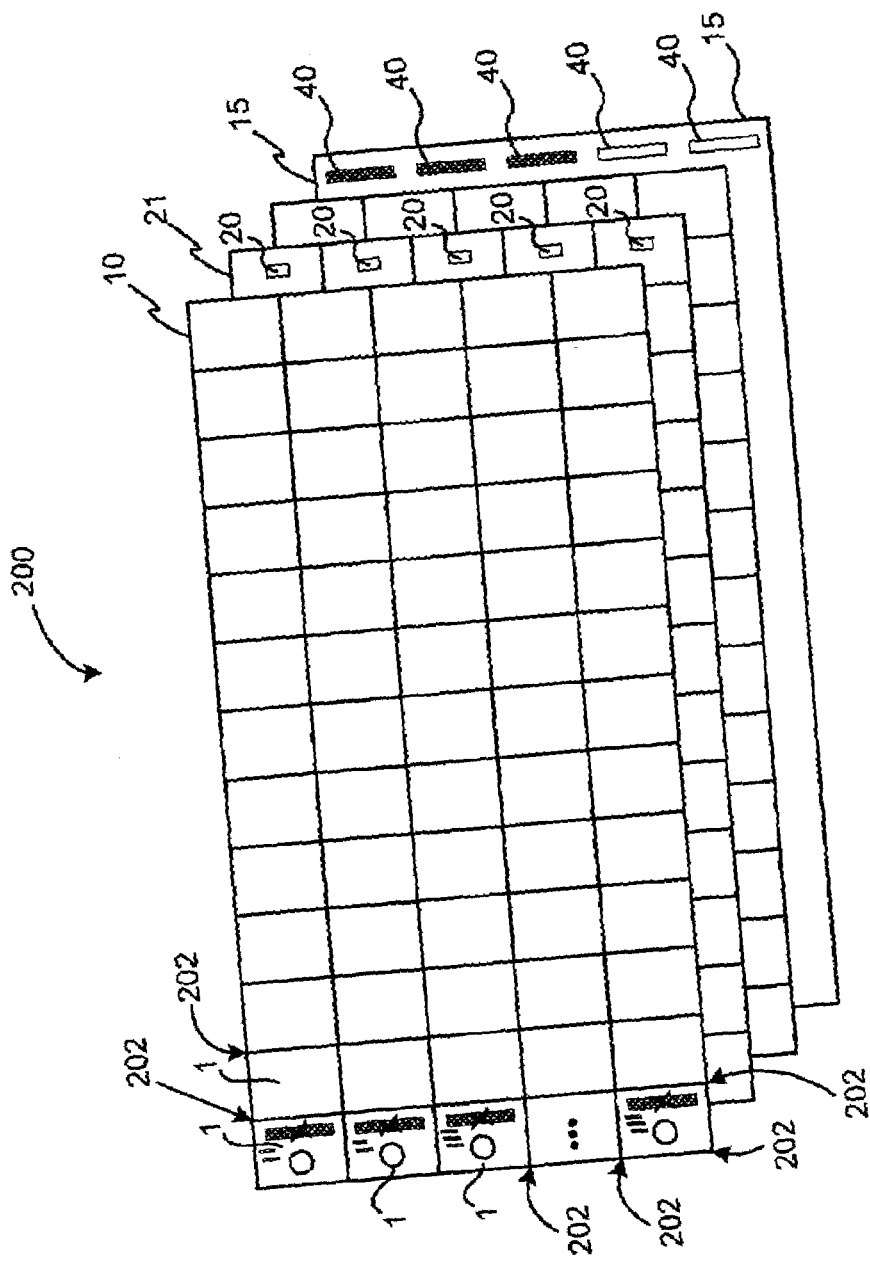
FIG. 4 illustrates an exploded view of an exemplary sheet of a plurality of transaction cards including a RFID circuitry sheet in accordance with an exemplary embodiment of the present invention.

In the exemplary embodiment shown, sheet 200 may be formed using multiple material layers. FIG. 4 illustrates an exploded view of an exemplary sheet 200, which may be used with the present invention. Sheet 200 includes a front material layer 10 and back material layer 12 consisting of a plastic substrate such as, for example, clear core PVC. One skilled in the art will appreciate that layers 10 and 12 of card 1 may be any suitable transparent, translucent and/or opaque material such as, for example, plastic, glass, acrylic and/or any combination thereof. Each material layer 10, 12 is substantially identical and is preferably about 3'×4' (622 mm×548 mm) and about 0.005–0.350 inches, or more preferably 0.01–0.15 inches or 13.5 mil thick.

The fabrication of the individual card sheets 200 may include either direct layout (9 layers) of film or the use of a sub-assembly (5 layers). An exemplary sub-assembly layer 21 may consist of 5 layers of film with room temperature tack adhesive applied over thermoset and thermoplastic adhesives. The resulting cards comprise (from the card front towards the card back) 2.0 mil outer laminate (PVC, polyvinylchloride) including having a holographic foil, embossed surface, chip and other indicia on its surface, 9.0 mil printed PVC core with print side out (card front), 2.0 mil PVC adhesive, 1.7 mil PET GS (extrusion coated polyethyleneterephthalate—gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (card back), and 2.0 mil outer back laminate with a signature panel, applied magnetic stripe and other indicia. Optimally, the PET IR blocking film is fabricated in the middle of the layers to balance the card and minimize warping of the resulting card product.

After eventually combining the sheets, by preferably adhering the front layer 10 on top of the back sheet 12, the total thickness of the transaction card 1, including the subassembly sheet 21, is about 0.032 in. (32 mil.), which is within the ISO thickness standard for smart cards. in one embodiment, the subassembly sheet 21 may be formed including RFID circuitry 20, which may be of sufficient thickness to maintain the smart card standard thickness. Alternatively, the RFID circuitry 20 may be embedded in the sheet 12 or card 1 via a suitable conventional milling process. Because the RFID circuitry 20 (called "RFID module 20" herein) may eventually embedded into the surface of the substrate or the subassembly 21 as described more fully below, the module 20 does not affect the thickness of the overall card 1. Moreover, the about 3'×4' sheets include predefined alignment markings which define the boundaries of the individual cards 1 to be cut from the sheet. Each exemplary sheet yields over 50 transaction cards (typically 56 cards), wherein each card 1 is within the ISO card size standard, namely about 2"×3.5".

In an exemplary embodiment, certain compounds are printed over the surface of sheets 10 and 12. The compounds may be printed in accordance with accepted ISO standards. One skilled in the art will appreciate that the printing of the text 30 and logo 50, and optically recognizable ink may be applied to any surface of card 1 such as, for example, the front 10 face (front material layer 10), the rear 12 face (rear material layer 12), the inside or outside surface of either face, between the two sheets of base material and/or a combination thereof. Moreover, any suitable printing, scoring, imprinting, marking or like method is within the scope of the present invention.

The text 30 and logo 50 are printed on the outside surface of each material layer 10, 12 by a known printing process, such as an offset printing process, which provides a thinner ink coverage, but clearer text. More particularly, with respect to offset printing, the artwork is duplicated onto a metal plate and the metal plate is placed onto an offset press printing machine which can print up to four colors during a single run. The offset printed text may include, for example, a corporate name, a copyright/trademark/patent notice, a batch code number, an "active thru" date, contact telephone numbers, legal statements and/or the like. The exemplary offset text may be printed in 4 DBC in opaque white ink or a special mix of Pantone Cool Gray 11 called UV AMX Gray. In one exemplary embodiment, the offset printed text is printed directly on the RFID module 20, such that the text is visible on the module 20 through casual inspection.

A laminate material layer 15 is applied to the back layer 12 of card 1. In one preferred embodiment, the laminate layer 15 includes rows of ISO compliant magnetic stripes 40, wherein each magnetic stripe 40 corresponds to an individual card 1. The magnetic stripe 40 may extend along one length of the card 1 and is applied to the back surface 12. The magnetic stripe 40 may be any width, length, shape, and placed on any location on card 1. In an exemplary embodiment, the magnetic stripe 40 is applied to the outer laminate layer 15 using a tape layer machine which bonds the cold peel magnetic stripe 40 to the outer laminate 15 when it is in a rolled position (not shown). The laminate 15 roll with a rolling hot die and at suitable pressure. The roll is then cut into layers 10, 12 before the card layers are assembled.

After the desired printing is complete and the magnetic stripe applied, the front 10 and back 12 material layers are placed together, and the layers are preferably adhered together by any suitable adhering process, such as a suitable adhesive. One skilled in the art will appreciate that, instead of printing on two material layers and combining the two material layers, a single plastic material layer can be used, wherein the single material layer is printed on one side, then the same material layer is re-sent through the printer for printing on the opposite side.

In the present invention, after adhering the layers together, a layer of lamination (not shown), approximately the same dimensions as the plastic sheets, namely 3'×4', may be applied over the front 10 and back 12 of card 1. After the laminate is applied over the front 10 and back 12 of the combined plastic material layers, card 1 layers are suitably compressed at a suitable pressure and heated at about 300 degrees, at a pressure of between 90–700 psi, with a suitable dwell time to create a single card 1 device. The aforementioned card fabrication can be completed by, for example, Oberthur Card Systems, 15 James Hance Court, Exton, Pa.

In an exemplary embodiment, the card layers 10 and 12 are fused together in a lamination process using heat and pressure. During the hot press phase, the press is heated to about 300 F. degrees and the pressure builds to about 1000 psi and holds for about 90 seconds. The pressure then ramps up to about 350 psi over an about 30-second period and holds for 16 minutes at the same temperature, namely 300 F. degrees. The sheet 200 is then transferred to a cold press which is at about 57 F. degrees. The pressure builds to about 400 psi and is held for about 16 minutes as chilled water of about 57 F. degrees is circulated in the plates. The cold press then unloads the sheet 200.

In one exemplary manufacturing embodiment, the cards 1 may include internal circuitry for use in completing contactless transactions. For example, card 1 may include a RFID module 20 included in the card body and preferably may be included in subassembly sheet 21. The RFID module 20 is preferably positioned substantially central to the card body but may be positioned at any desired location therein. The RFID module 20 may be included interposed between front surface material layer 10 and back surface material layer 20 during fabrication of the sheet 200. Specifically, the module 20 may be included interposed between at least two layers of the subassembly sheet 20. Alternatively, after lamination, the RFID module 20 may be included within an individual card 1 within a space created by milling the card body and providing room for the insertion of the RFID module 20. As such, upon including the RFID module 20, sheet 200 will comprise a plurality of RFID operable transaction cards 1 wherein each transaction card 1 includes a RFID module 20. Traditional methods for including RFID module 20 in transaction devices 1 are well known, and are intended to be within the scope of the invention.

RFID module 20 may include an antenna 204 for receiving an interrogation signal from RFID reader 104 via antenna 108 (or alternatively, via external antenna 106). Module antenna 204 may be in communication with a transponder 214. In one exemplary embodiment, transponder 214 may be a 13.56 MHz transponder compliant with the ISO/IEC 14443 standard, and antenna 204 may be of the 13 MHz variety. The transponder 214 may be in communication with a transponder compatible modulator/demodulator 206 configured to receive the signal from transponder 214 and configured to modulate the signal into a format readable by any later connected circuitry. Further, modulator/demodulator 206 may be configured to format (e.g., demodulate) a signal received from the later connected circuitry in a format compatible with transponder 214 for transmitting to RFID reader 104 via antenna 204. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the module 20 account number. In this regard, protocol/sequence controller 208 may be any suitable digital or logic driven circuitry capable of facilitating determination of the sequence of operation for the module 20 inner-circuitry. For example, protocol/sequence controller 208 may be configured to determine whether the signal provided by the RFID reader 104 is authenticated, and thereby providing to the RFID reader 104 the account number stored on module 20.

To authenticate the signal, the protocol/sequence controller 208 may be further in communication with authentication circuitry 210 for facilitating authentication of the signal provided by RFID reader 104. Authentication circuitry may be further in communication with a nonvolatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data cables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data received from the reader 104 or the database 212 may be used by protocol/sequence controller 208 for data analysis and used for management and control purposes, as well as security purposes. Authentication circuitry 216 may authenticate the signal provided by RFID reader 104 by association of the RFID signal to authentication keys stored on database 212. Authentication circuitry 216 may be in further communication with an encryption circuitry 216 which may encrypt or decrypt the reader 104 signal or the data (e.g., account number, user identifier, device identifier, etc.) returned from database 212 prior to transmitting the data. Encryption circuitry 216 may use keys stored on database 212 to perform encryption and/or decryption of signals sent to or from the RFID reader 104.

In addition, protocol/sequence controller 208 may be in communication with a database 212 for storing at least one of a module 20 account data, a unique module 20 identification code, user identification code, or transaction device identifier. Protocol/sequence controller 208 may be configured to retrieve the account number from database 212 as desired. Database 212 may be of the same configuration as database 212 described above. The account data and/or unique device identification code stored on database 212 may be encrypted prior to storage. Thus, where protocol/sequence controller 208 retrieves the account data, and or unique transaction device identifier, or the like, from database 212, the data may be encrypted by the encryption circuit 216 when being provided to RFID reader 104. Further, the data stored on database 212 may include, for example, an unencrypted unique module 20 identification code, a user identification ISO/IEC, Track 1 and 2 data, as well as specific application applets. The data may additionally be stored in the database 212 in Track 1/Track 2 format and may also be in Track 1/Track 2 format when provided to the reader 104.

In an exemplary operation, the module 20, is placed in proximity to reader 104 when the user wishes to conduct a transaction. The user simply waves the module 20 at a certain distance from the RF-based reader 104 until the reader 104 acknowledges that the information contained in the RFID module 20 has been received. The RF-based reader 104 then utilizes at least a portion of the information provided by module 20 (such as, a user's account number associated with the transaction device) to complete the transaction. The reader 104 may receive the account information from the module 20 and verify the account information authenticity prior to forwarding the account information to merchant system 130. Alternatively, the reader 104 may forward the account information to a merchant system 130 (via the merchant system POS 110) which may provide the account information to a transaction device issuer system (via network 112) for transaction completion. The merchant system 130 forwards the account information to an account issuer system, which may complete the transaction under issuer defined business as usual protocol Exemplary transaction completion methods and transaction device components are disclosed in the commonly owned U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002, incorporated herein in its entirety.

With reference to FIG. 3, after the card sheet 200 is prepared, including the RFID module 20, the sheets may be cut into individual cards 1 by a known stamping process, including any necessary curing, burrowing, heating, cleaning and/or sealing of the edges. The individual transaction cards 1 are about 2"×3.5" and conform to ISO standards for transaction card 1 shape and size. As used hereinafter, the transaction card 1 is termed the transaction device "transporter," since the transaction device issuer may provide the RFID module 20 to a user when the module 20 is still affixed to the transporter 1 as described below.

In an exemplary embodiment, the laminated sheet 200 of 56 transaction device transporters 1 (including the RFID module) are suitably cut in half on a guillotine device, resulting in two half-sheets of 28 transporters 1 and module 20 combinations. The half-sheets may be loaded onto any conventional card punch machine which aligns the sheets to a die (x and y axes) using predetermined alignment marks 202 visible to the optics of the machine. The half-sheets are then fed under a punch to punch out the desired transporter device 1 and module 20 (called "transaction device combination") shape. Particularly, a fixed distance feed is followed by another optic sensor search to stop the feed at the preprinted alignment mark, then the machine punches a row of four transaction device combinations out at one time, each punch being made along a preprinted alignment mark 202.

The preprinted alignment marks 202 indicate the perimeter boundaries of each transaction device transporter 1 to be cut from sheet 200. To separate each transaction device combination from the other, the cuts may typically be made along the preprinted alignment marks 202. In general, the preprinted alignment marks 202 are included in the sheet 200 as the writing is being added to the device material layers 10, 12. A typical sheet 200 may yield over 50 transaction device combinations (typically 56). In general, the shape of the transporter 1 is kept consistent by using a cutting apparatus having a preformed cutting dye formed in the desired shape. For example, the cutting dye may be formed in any shape, such as, for example, a traditional credit card shape as shown in Figure Alternatively, the shape is cut by using, for example, a laser or other cutting apparatus guided by any suitable preprinted alignment marks 202. The resulting individual transaction device combination may then be distributed for immediate activation and use.

Conventional methods of fabricating, manufacturing and cutting transaction devices, such as, credit cards, smart cards, RFID key fobs are well known. As such, one skilled in the art will understand the machinery and processes for fabricating, manufacturing, and/or cutting as they are included in the scope of this invention. Indeed, in the interest of brevity, conventional methods of fabricating, manufacturing and cutting transaction devices will not be discussed in detail herein. For instruction on manufacturing and fabricating a typical transaction card, see U.S. patent application Ser. No. 10/092,681, entitled "TRANSACTION CARD," filed Mar. 7, 2002, and incorporated herein in its entirety.

While the foregoing describes an exemplary embodiment for the fabrication of transaction device combination, one skilled in the art will appreciate that any suitable method for incorporating text 30, logos 50, a magnetic stripe 40, a signature field, holographic foil 15 onto a substrate in accordance with accepted 160 standards, is within the scope of the present invention. Moreover, the holographic foil, RFID module 20, logo 50, magnetic stripe 40, signature field or any other compound may be included on the transporter 1 by any suitable means such as, for example, heat, pressure, adhesive, grooved and/or any combination thereof. In accordance with one embodiment, the text 30, logo 50, magnetic stripe 40, or holographic foil 15 may additionally be included in one surface use of the module 20 on a portion easily viewable by casual inspection.

Figure 7:
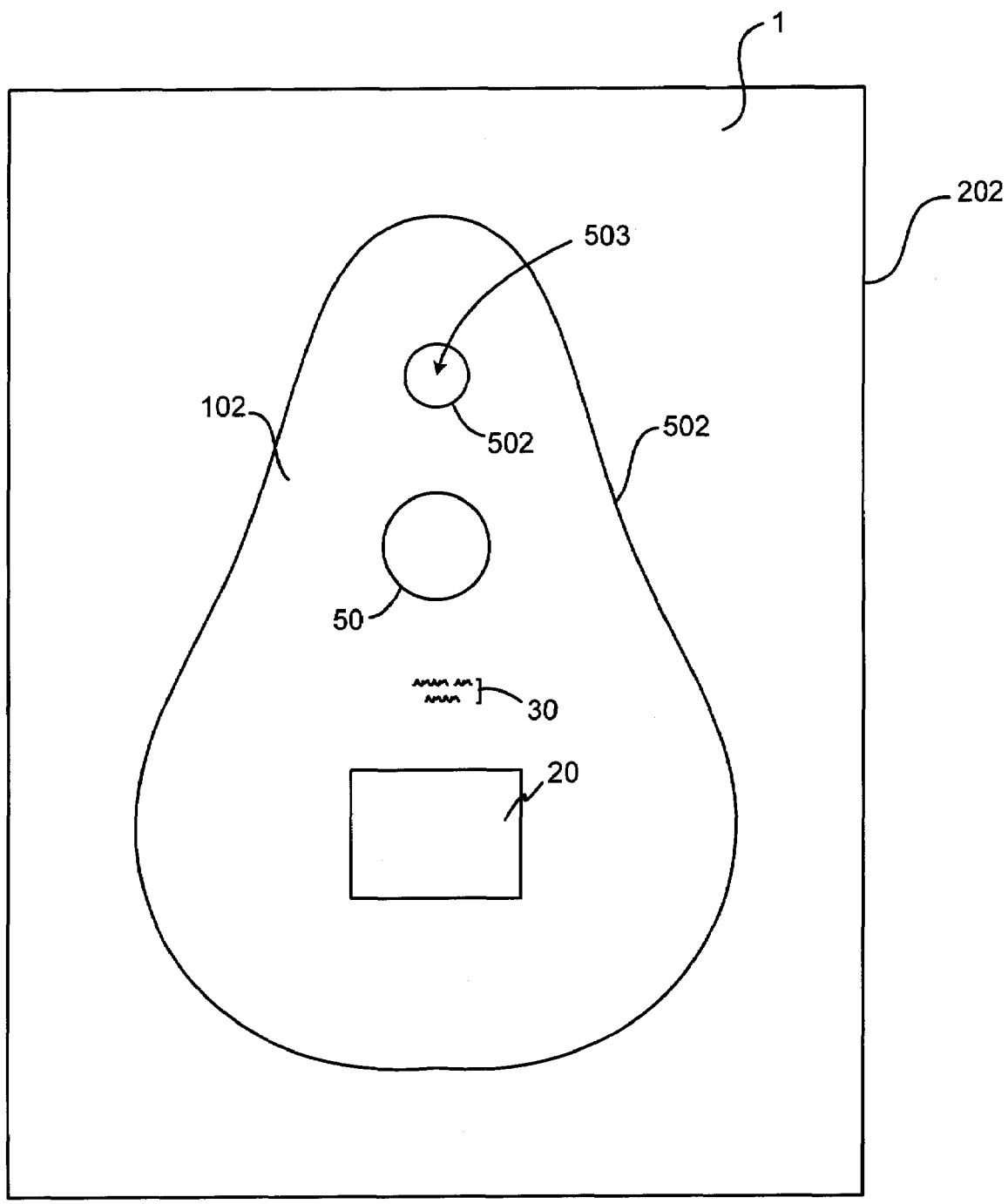
FIG. 7 depicts the front surface of an exemplary RFID transaction device combination in accordance with an exemplary embodiment of the present invention.

As noted, various card manufacturers are producing RFID transaction devices that are irregularly shaped. As such, the irregular shaped transaction devices are typically cut using a cutting dye, or other method discussed above, which is designed to cut a sheet 200 into the desired transaction device shape. Consequently, manufacturers must often retrofit their machinery to cut the irregular shape. Returning now to FIG. 5, a teardrop shaped RFID transaction device (key fob) 500 is shown. To provide transaction devices of similar shape as device 102, a card manufacturer may typically use a cutting machine including a teardrop shaped cutting dye, or a cutting means guided by the preprinted device 102 alignment marks 502 (also shown in FIG. 7). As can be seen, the RFID transaction device 102 may include a logo 50.

Figure 8:
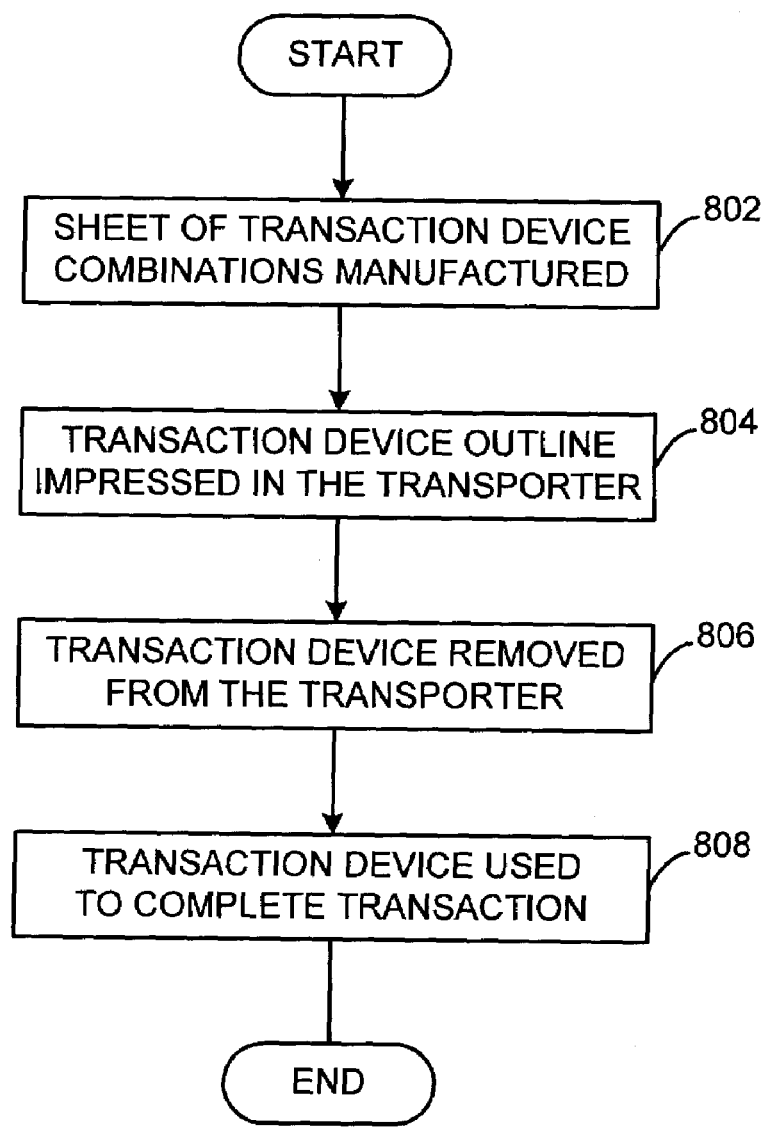
FIG. 8 illustrates an overview of an exemplary method for providing a transaction device to an end user in accordance with exemplary embodiments of the present invention.
Figure 9:
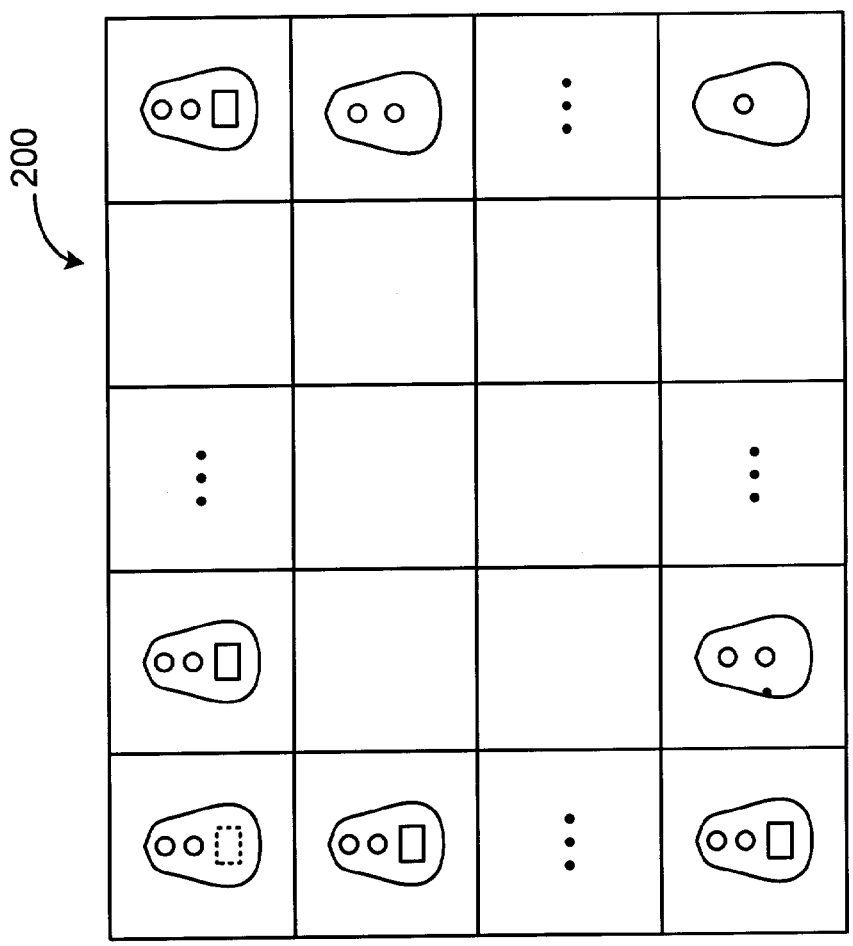
FIG. 9 shows an exemplary sheet of a plurality of cojoined transaction device combination each including a RFID transaction device, therein, in accordance with an exemplary embodiment of the present invention.

In accordance with one aspect of the invention, a credit card manufacturer may provide an irregularly shaped RFID transaction device 102 using a manufacturing process that is coextensive with the manufacturing process used for traditional transaction card 1 shapes. That is, the transaction devices 102 and transporters 1 may be manufactured, cut, perforated, or impressed without need to manufacture the devices independently of the transporter 1. FIG. 8 depicts an exemplary overview of any transaction device combination manufacturing method according to the invention. As shown in FIG. 8, and with continued reference to FIG. 7, a transaction device sheet 200 (shown best in FIG. 9) including a plurality of conjoined RFID transaction device combinations 1 is provided using any of the manufacturing methods discussed herein (step 802). The transporter 1 may include an outline of irregularly shaped transaction devices 102 defined by alignment marks 502. Alignment marks 502 may ordinarily be imprinted and pressed within the outline of the transporter 1 defined by the preprinted alignment marks 202. The sheet 200 may be prepared using conventional RFID transaction device and transaction card fabricating methods. The outline of the irregular shaped removable RFID transaction device 102 which is shown as preprinted alignment marks 502 in FIG. 7, may be pressed into, and contained substantially inside, the preprinted alignment marks 202 of the transporter 1 (step 804). The alignment marks 502 may be pressed into the surface of the transponder and substantially therethrough. Preferably, the alignment marks 502 are pressed into the surface of the transporter 1 such that the transporter 1 and transaction device 102 are in physical contact. However, the irregular shaped removable RFID transaction device 102 may then be removed from (i.e., "punched out" of) the transporter 1 by using minimal physical force at preprinted alignment marks 202 (step 806). The resulting RFID transaction device 102 may then be used in completing a RF transaction under any merchant or account provider business as usual standards (step 808).

To assist in punching out or removing the transaction device 102, the RFID transaction device 102 preprinted alignment marks 502 may be pressed into the body of transporter 1 defined by preprinted alignment marks 202. As noted, the transporter 1 may be formed with one or more material layers, such as, for example, front layer 10, and back layer 12. The pressing action may result in indentations, or perforations being impressed into or through one or more layers of the multilayer transaction device. However, the perforations or indentations may not traverse completely through the card body. Instead, the perforations or indentations are impressed at such sufficient depth to permit the transaction device 102 to be removed from the transporter 1 with the application of minimal physical force. Thus, the perforations or indentations are typically provided along the transaction device 102 preprinted alignment marks 502 to facilitate the removal of the transaction device 102 from the transporter body. In one exemplary embodiment, the perforations and indentations, which may be used to form the outline of the transaction device 102, may also be arranged to form an outline of a shape, a picture, a security enhancing visage, or the like as desired by the manufacturer or system user. Suitable methods for providing perforations are disclosed in U.S. patent application Ser. No. 10/288,945, entitled "PERFORATED TRANSACTION CARD," filed Nov. 6, 2002, incorporated herein by reference in its entirety.

Figure 10:
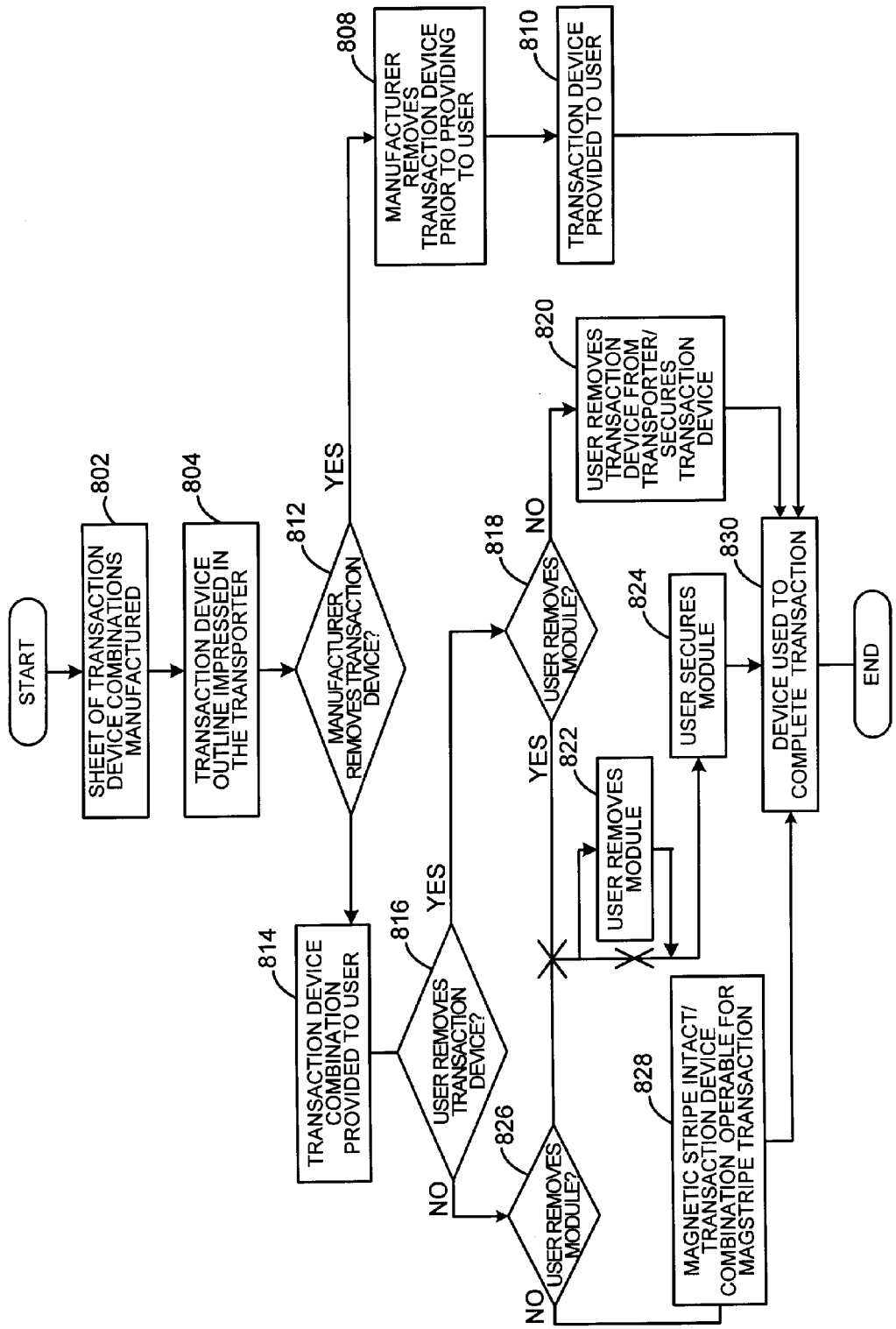
FIG. 10 is an exemplary detailed flowchart of an exemplary method for providing a transaction device to an end user in accordance with exemplary embodiments of the present invention.

FIG. 10 illustrates various exemplary embodiments of a method for providing to a user RFID transaction device 102 which may be removed from a transporter 1. In accordance with step 802, each exemplary embodiment begins with the fabrication of a multilayer sheet 200 of a plurality of conjoined transaction device combinations.

In accordance with one exemplary embodiment of the present invention, the transaction device 102 outline (lines 502) is impressed within the outline of the transporter 1 drawn by alignment marks 202. For example, the preprinted sheet 200 of transaction device combinations is provided with the transporter 1 alignment marks 202 preprinted on the combination's front or rear surface 10, 12, and the transaction device outline 502 ("alignment marks 502") is impressed within the alignment marks 502 (step 804).

Once the impression of the transaction device 102 is made in the transporter 1, the transaction device manufacturer may remove the transaction device 102 from the transporter 1 and provide the transaction device 102 to an end user. In one exemplary embodiment, the transaction device 102 is removed from the transporter 1 by the manufacturer (step 808) prior to providing the transaction device 102 to a user for device activation and device usage (step 810). In this way, the transaction device 102 may be provided to a user independent of the transporter 1. The user may use the transaction device 102 to complete a transaction by placing the transaction device 102 in proximity to the reader 104 as described above (step 830).

In an alternate embodiment of the invention, the RFID transaction device 102 is not removed by the manufacturer, but instead the RFID transaction device 102 is removed from the transporter 1 by the end user (step 812). For example, a transaction device provider may provide a user with the transaction device combination, including the transporter 1, and the transaction device 102, which includes RF module 20 (step 814). The user may then decide whether to remove the transaction device 102 from the transporter 1, which may be removed at the user's leisure (step 816). Should the user remove the transaction device 102, the user may additionally decide whether to remove module 20 (step 818). The user may remove the transaction device 102 to complete a transaction independent of the transporter 1 (step 830). The user may remove the transaction device 102 from transporter 1 by applying minimal physical force at the transaction device outline 502. The transaction device 102 may be removed manually or by cutting, tearing, or the like, (step 820). The user may use the transaction device 102 by placing the transaction device 102 in proximity to reader 104, as described above (step 830). The RFID module 20 may then provide transaction device account information to a RFID reader 104 for transaction completion.

The transaction device 102 may include an aperture 503, which may be formed by pressing the shape of the aperture 503 in the transporter 1 along alignment lines 502, perforating the transaction device 102 shape in the transporter 1 using any conventional machinery or method as described above. The aperture 503 may then be punched out or removed, wherein the portion of the transporter 1 within the aperture 503 is removed leaving an opening therein. The transaction device 102 may then be secured to a user's person or often used personal article by inserting one end of a tether-like means (not shown) through aperture 503 and securing the other end of the tether-like means to a transaction device 102 user person or often used personal article (e.g., keychain, fob chain, key ring, string, strap, belt, rope, etc.) which is ordinarily easily portable (step 820). The user may then use the transaction device 102 in similar manner as discussed above (step 830).

Figure 11:
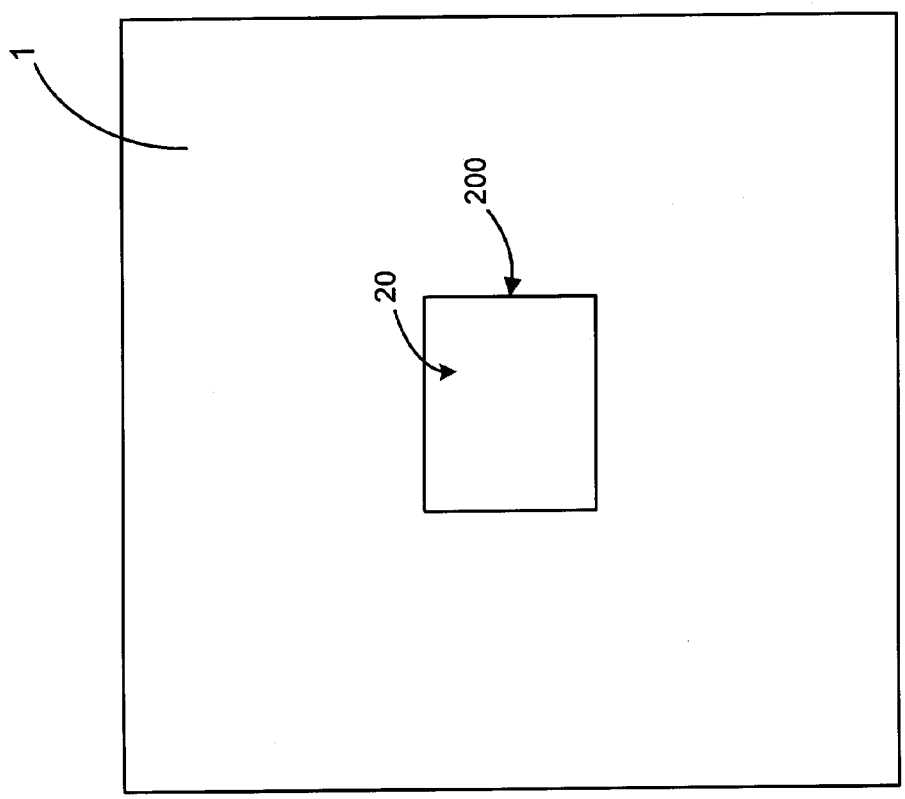
FIG. 11 depicts an exemplary transporter and RFID module combination in accordance with the present invention.

In another exemplary embodiment of the invention, user or transaction device manufacturer may remove the RFID module 20 from the transporter 1 to enable use of the module 20 to complete a transaction independent of any other portion of the transporter 1 or the transaction device 102 (step 822). In this instance, the transaction device issuer may configure the stamping machinery to preprint alignment marks which closely mimic the shape of the module 20. As shown in FIG. 11, the transporter 1 may include a square shaped module 20 including alignment marks 220. In similar manner as previously described, the issuer may perforate the transporter 1 along the alignment marks 220 to facilitate easy removal of the module 20 from the transporter 1 by the user or the issuer. The module 20 outline may be pressed substantially, but not completely, through transporter 1 body. In this way, the user may remove module 20 from transporter 1 with minimal physical force (step 822). The user may then use the module 20 to complete a RFID transaction by positioning the module 20 in proximity to the reader 104 in similar manner as was described with the transaction device 102 (step 830).

Figure 12:
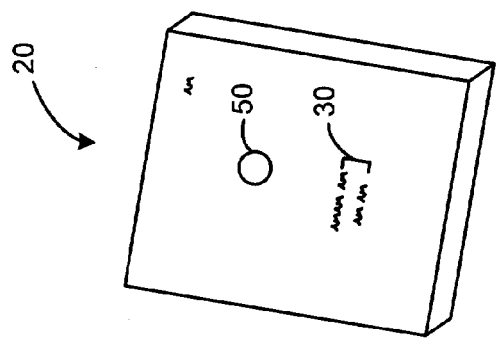
FIG. 12 depicts an exemplary RFID module removed from a transporter in accordance with the present invention.

FIG. 12 shows the RFID module 20 removed from the transporter 1. As shown, the module 20 may include the offset printed text described above (e.g., logo, text 30, logo 50, active through date, telephone numbers, etc.), which is perceptible to the casual observer by visual inspection. The module 20, may be a self-contained device in that the module may be used to complete transactions irrespective of the transporter 1. In exemplary embodiment, the module 20 may be of sufficient size that it is easily punched out or removed from the transporter 1. For example, the module may be 1×1 9/16", although other suitable sizes are contemplated.

In one exemplary embodiment, the user may use the module 20 with any portable form factor configured to secure the module 20 during transaction completion (step 824). Preferably, the form factor is embodied in an article frequently used by the module user. For example, the module 20 may be secured to any portable apparatus which may be manually transported by the module 20 user, and which may be used to facilitate manually presenting the module 20 to a RFID reader 104 for transaction completion. A suitable portable apparatus may include means for securing the module 20 to the apparatus.

Figure 13:
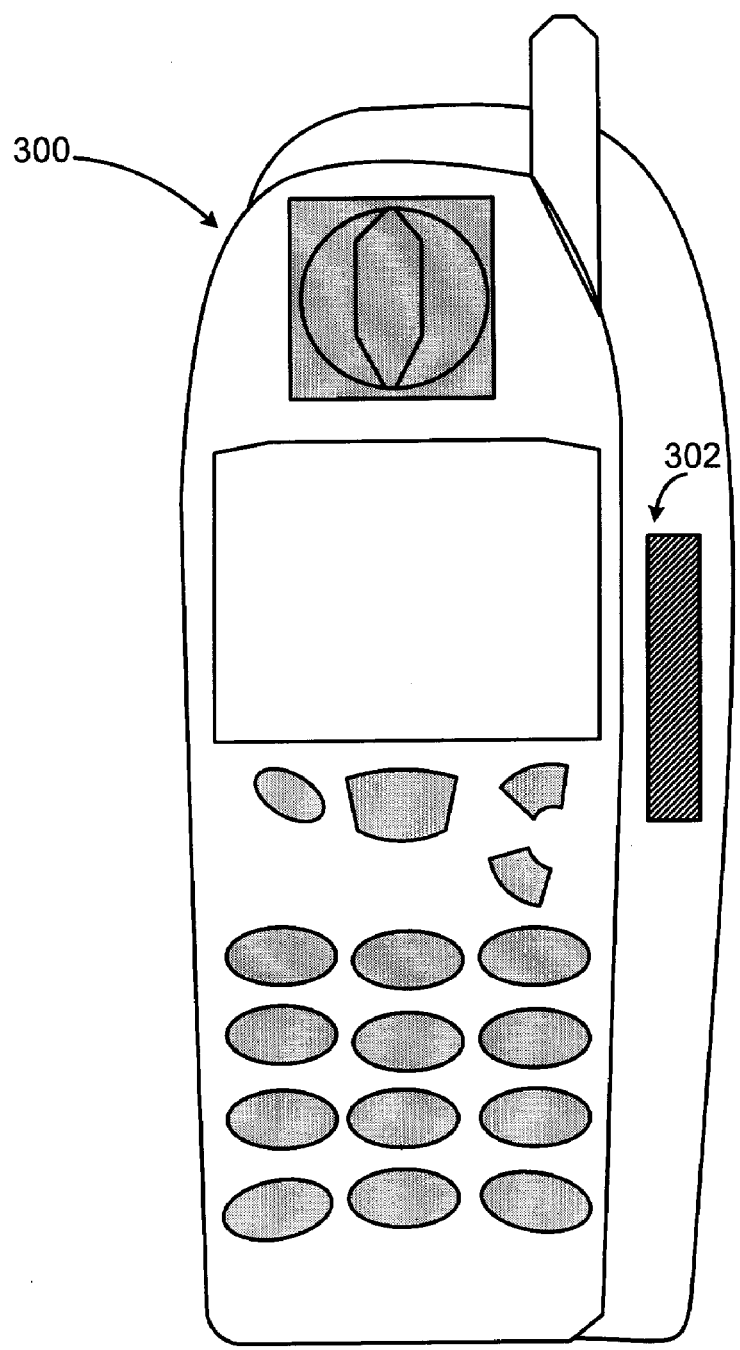
FIG. 13 depicts an exemplary embodiment of a suitable frequently used portable form factor comprising a recess for including a RFID module in accordance with the present invention.

FIG. 13 shows an exemplary apparatus for securing and presenting the module 20 for transaction completion which may be used in accordance with the present invention. As shown, the apparatus may be a conventional cellular phone 300 although any portable form factor may be used, the cellular phone 300 may include a recess 302 which may be configured to accept the module 20 therein. The recess 302 is preferably included in one surface of the phone 302 at sufficient depth to substantially recess the module 20 therein, to secure the module 20. The recess 302 may further be configured to hide the module 20 from view. The module 20 may thereby be inserted in the recess 302 and secured by any fastening means such as clips, molded clips and fittings, screws, glue, soldering or the like. The module 20, may be inserted into the recess 302 of the cellular phone 300 prior to providing the phone 300 to the user. Alternatively, the module 20 may be provided to the user in a transaction device combination, and the module may be removed from the transporter 1 and the transaction device 102 and inserted in the recess 302 by the user. Further still, the module 20 may be provided to the user in the transporter 1 or the transaction device 102, and the user may remove the module 20 at the user's leisure.

Figure 14:
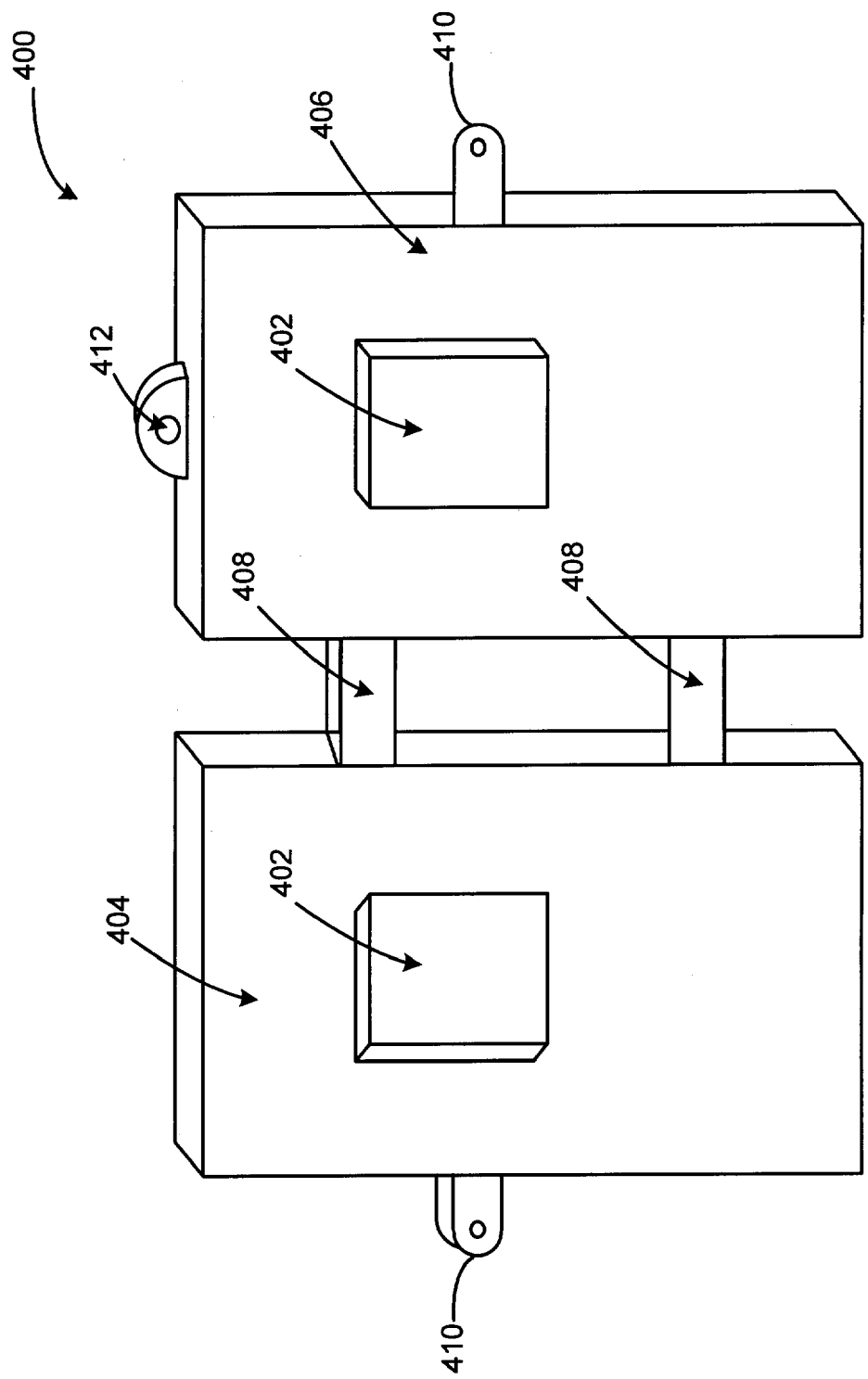
FIG. 14 depicts an exemplary RFID module carrier in accordance with the present invention.

In yet another exemplary embodiment, as shown in FIG. 14, a portable carrier 400 may be provided to the user for securing the module 20 during transaction completion. Carrier 400 may be of any desired shape but is preferably of sufficient size to substantially enclose the module 20 in use. The carrier 400 may be constructed of any durable or sturdy material such as metal, plastic, composite materials or the like. The carrier 400 may additionally be transparent or translucent to permit casual viewing of the module 20 when the module 20 is secured therein.

For example, in the embodiment shown, carrier 400 is of similar shape as the module 20 depicted in FIG. 12 (e.g., square), although the carrier 400 may take any shape. Preferably, the carrier 400 may be dimensionally larger than the module 20 to ensure that the module may be enclosed therein although any carrier 400 shape or size may be used. The carrier 400 may include a recess 402 in which the module 20 may be snuggly fitted. The carrier 400 may include a first 404 and second 406 carrier door. First 404 and second 406 carrier door may include the recess 402 included in one panel of each door. The recess 402 forms a cavity when the doors 404, 406 are positioned one on the other. The module 20 may be secured in the cavity. The doors 404 and 406 may be in communication along one side by hinges 408, which permit the doors 404, 406 to be closed one on top of the other with the module 20 interposed in between. The doors 404, 406 may be secured one to the other by the hinges 408 and a suitable latch 410 configured to ensure that the doors 404, 406 remain fastened one to the other and the module 20 remains inside the carrier 400 during transaction completion.

Carrier 400 may further include an aperture 412 in at least one end of the door 404, 406. The aperture 412 may be used in similar manner as with aperture 503 of FIG. 7. That is, the carrier 400 (which may include the module 20) may be secured to a user's person or to an apparatus the user frequently handles.

Alternatively, the carrier may be secured to the apparatus, such as cell phone 300 using any suitable attachment method. For example, the carrier 400 including the module 20 may be fastened to the cell phone 300 using any attachment means, such as for example, screws, rivets, bonding compound, glue or especially made fastening construction operable to hold the carrier 400 in physical communication with the cell phone 1402. For example, one suitable attachment method may be the fastener described in U.S. Pat. No. 6,669,263, entitled "Attachment Device," which issued Dec. 30, 2003, to Asai, and U.S. Pat. No. 6,643,076, entitled "Attachment Device," which issued Nov. 4, 2003, to Montage, hereby incorporated by reference.

Figure 15:
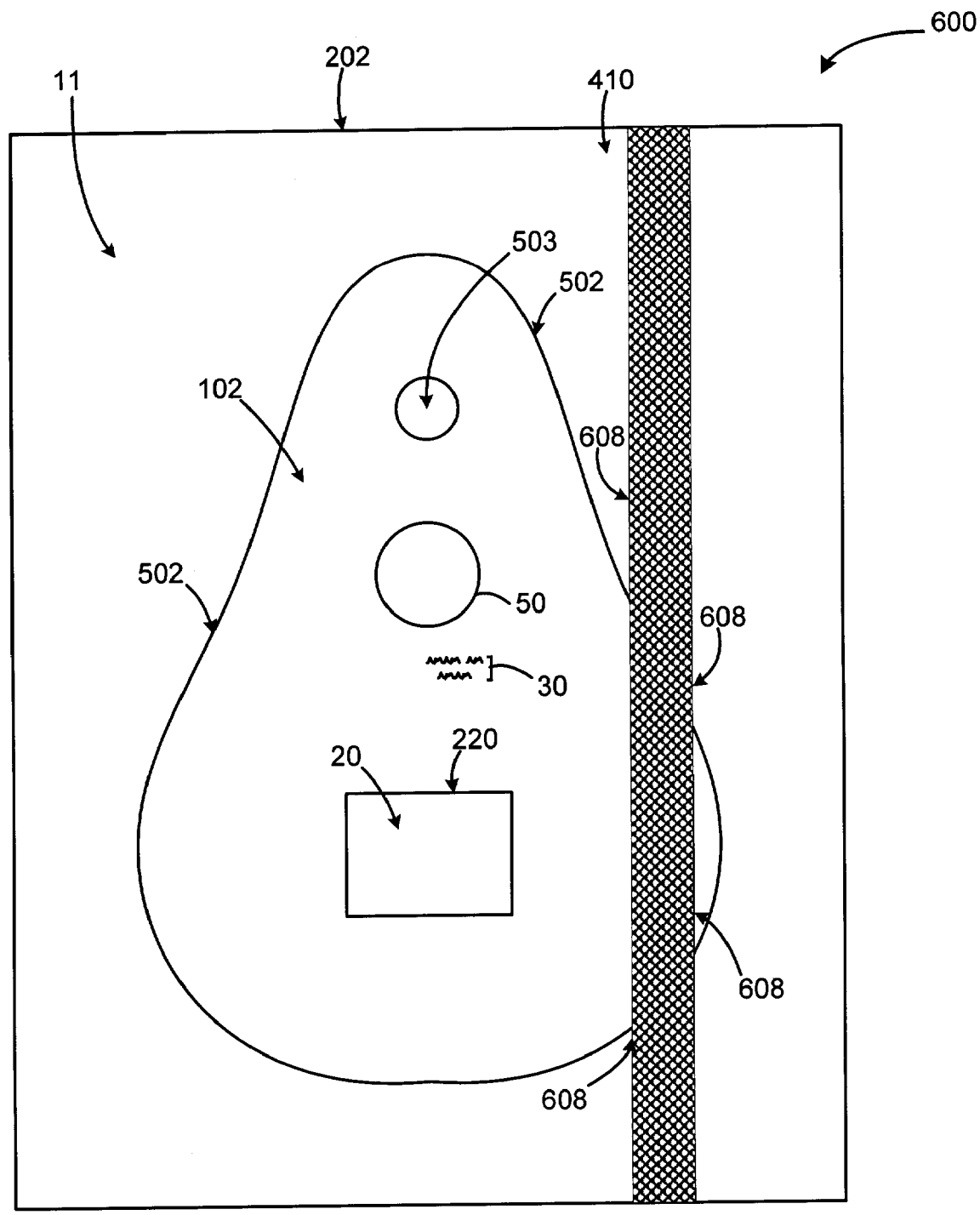
FIG. 15 depicts a transaction device combination including a magnetic stripe in accordance with exemplary embodiments of the present invention.
Figure 16:
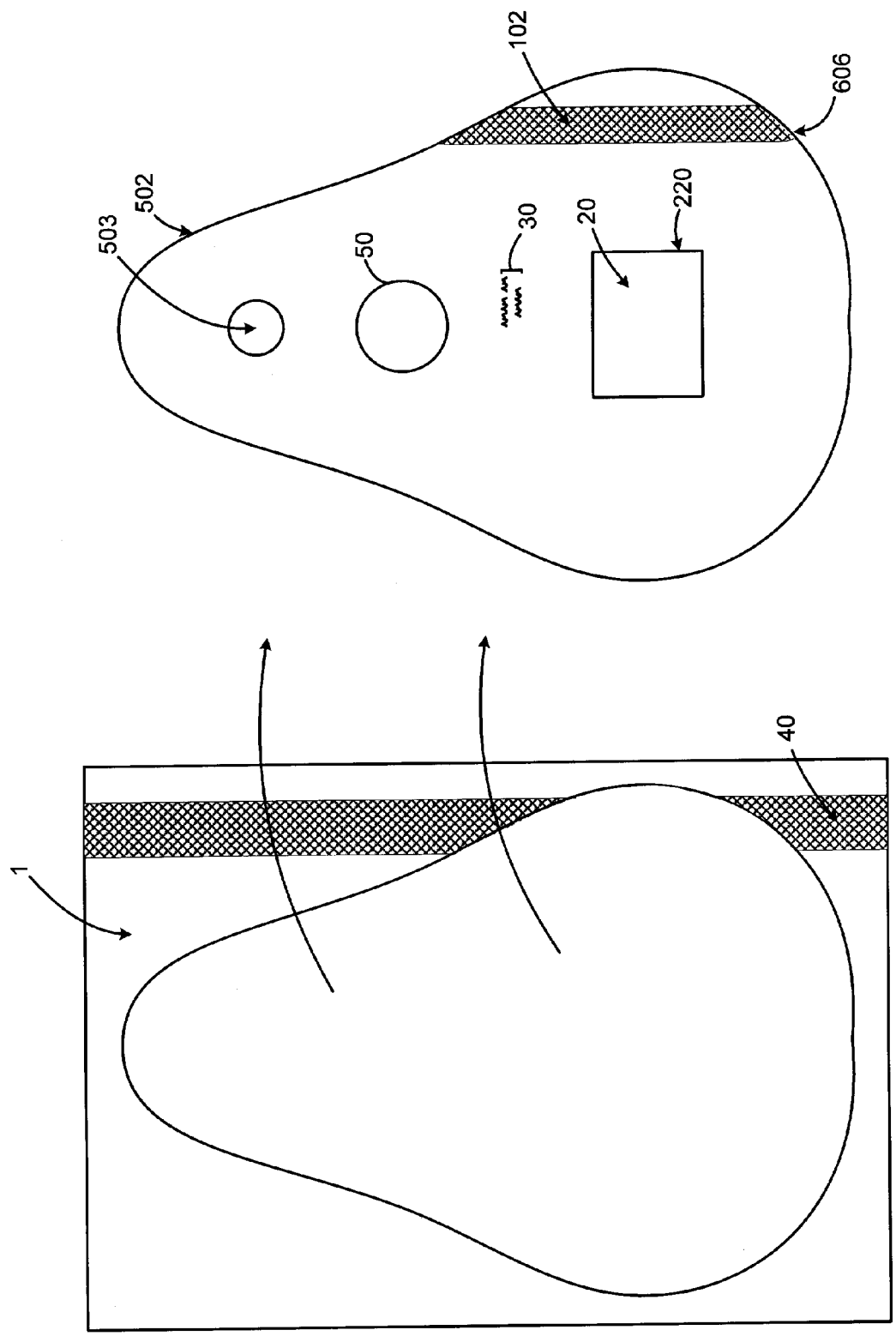
FIG. 16 depicts a transaction device combination with the transaction device removed in accordance with exemplary embodiments of the present invention.

Returning now to FIG. 8, in yet another exemplary method, the user may not wish to remove the module 20 or the transaction device 102 from the transporter 1 (steps 816 and 826). Instead, the user may wish to use the transaction device combination to complete a transaction. That is, the transaction device combination may be used with the module 20 and the transporter 1 intact. FIG. 15 shows an exemplary depiction of a transaction device combination 600 in accordance with the present invention which may be used to complete a transaction. FIG. 15 depicts a transaction device combination 600 which includes a transporter 1 and a RFID module 20. The combination 600 may further include the impression of the transaction device 102 although not required. For example, the transporter 1 may include alignment lines 502 which trace a shape of a transaction device 102 including the RFID module 20 the shape of which may be formed from impressed alignment lines 220. Perforations may be made along the alignment lines 502, 220 which trace at least one of the shape of transaction device 1508 or the module 20.

The transporter 1 may be configured with a magnetic stripe 40 using any conventional method for attaching magnetic stripes as is commonly known. The magnetic stripe 40 may be compliant to International Standard Setting Organization standards for the shape, location and the format of the data stored and retrieved from the magnetic stripe 40. The magnetic stripe 40 may be configured to include account data (e.g., account, user, or transaction device identifier, code or number) stored thereon in Track 1/Track 2 ISO magnetic stripe standard format. As such, the magnetic stripe 40 may be configured to be readable by any conventional magnetic stripe reader as is found in the art. Consequently, the user may use the transaction device combination 600 in similar manner as a traditional credit, debit, DDA, prepaid card, an the like. For example, the user may present the transaction device combination 600 to a magnetic stripe reader, which may retrieve the magnetic stripe 40 data and forward the data to an account issuer for transaction completion. Conventional methods for completing a transaction are well known and will not be repeated for brevity.

In one conventional construction of transaction device combination 600, the magnetic stripe 40 may be such that a portion of the alignment lines 502, including the impressed outline of the transaction device 102 may intersect the magnetic stripe 40, as shown in FIG. 15 at character reference 608. In this way, the transaction device 102 outline overlaps the magnetic stripe 40. As such, the transaction device 102 including module 20 may be removed from the transporter 1 and a portion of the magnetic stripe 40 is removed therewith as shown in Figure In this way, the user ensures that the transporter 1, including the remaining portion of the magnetic stripe 40, may not be used to complete transactions. This is true, since the magnetic stripe 40 will have a portion 606 of the magnetic stripe 40 removed when the device 102 is removed, thereby making the magnetic stripe 40 inoperable for transmitting complete magnetic stripe information. That portion 606 of the magnetic stripe 40, which is removed, may ordinarily be included as a portion of the transaction device 606 to ensure that the magnetic stripe 40 may be disabled when the transaction device 102 is removed. Once removed, the transaction device 102, or the module 20 may be used to complete a transaction in similar manner as was discussed above.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented. In addition, although the present description illustrates the invention as embodied in a card, key fob, or cellular phone, the invention is not so limited. That is, the present invention contemplates the incorporation of the inventive technology into a form factor presentable by hand.

The invention claimed is:

1. A method for providing a radio frequency identification (RFID) transaction device, comprising:
preparing a sheet of a plurality of RFID transaction device combinations, wherein each transaction device combination includes a transaction device transporter including a transaction device border defined by the transporter outside perimeter, and a RFID module contained within the transaction device transporter, the RFID module being operable to conduct a RFID transaction using RFID transmission; and
pressing a plurality of distinct RFID module outlines into the sheet, wherein each RFID module outline is pressed so as to lie substantially completely within a transaction device transporter outside perimeter, said pressing of the transaction device outlines being done with sufficient pressure to perforate substantially through the transporter so that the RFID module and the transporter may remain in physical communication, the pressed RFID module outline enabling removal of the RFID module from the transporter, the RFID module being configured to complete a RFID transaction independently of the transporter.

2. A method according to claim 1, further including the step of: providing he transporter and RFID module to a user prior to removing the RFID module from the transporter.

3. A method according to claim 1 further including pressing an outline of a transaction device into the transporter, wherein the transaction device outline is pressed substantially into the transporter at sufficient depth to permit the transaction device to be removed, the transaction device outline being pressed inside the transporter outer perimeter, and said RFID module outline being pressed inside the transaction device outline.

4. A method according to claim 3, further including the step of providing the transporter, transaction device and RFID module to a user for removal of the transaction device.

5. A method according to claim 3, wherein removal of the transaction device is done by a transaction device manufacturer, and the removing of a RFID transaction device is done by a transaction device user.

6. A method according to claim 1 further including providing a RFID outline for removing the RFID module, wherein the RFID module is removed by the user.

7. A method according to claim 6, further including the step of providing a RFID module case for securing the module.

8. A method according to claim 7, further including the step of providing the RFID module with textual or numerical identifiers, the textual or numerical information being positioned on at least one surface of the module.

9. A method according to claim 8, wherein the case is transparent, thereby permitting the textual or numerical identifiers to be viewed through a surface of the case by casual inspection.

10. A method according to claim 1, wherein the RFID module is International Standards Organization ISO/IEC 14443 compliant.

11. A method according to claim 1, wherein the transporter is International Standard Setting Organization ISO/IEC 7810 compliant.

12. A method according to claim 1, further including the step of providing a transporter including a magnetic stripe, the magnetic stripe being included on one surface of the transporter.

13. A method according to claim 12, wherein the magnetic stripe is International Standards Setting Organization 7811, et seq., compliant.

14. A method according to claim 12, wherein at least one of a transaction device account number, and transaction device identifier, and user identifier is stored in the magnetic stripe format in the magnetic stripe.

15. A method according to claim 14, further including the step of pressing an outline of a transaction device into the transporter, the outline pressed substantially through the transporter to enable the transaction device to remain in physical communication with the transporter, the transaction device removable from the transporter, the outline of the transaction device being pressed inside the transporter outer perimeter and outside the RFID module outline, wherein a portion of the removal transaction device intersects the magnetic stripe.

16. A method according to claim 15, further including the step of providing the transporter including the magnetic stripe, transaction device, and RFID module to a transaction device user, wherein the transporter, magnetic stripe and transaction device are provided as a transaction device combination, the magnetic stripe being operable to complete a magnetic stripe transaction.

17. A method according to claim 16, further including the step of providing the transporter device combination to a transaction device user, wherein at least one of the transaction device and RFIID module is removable from the transporter for independent RF transaction completion.

18. A method according to claim 17, further including the step of providing the transaction device combination to a transaction device user, wherein the transaction device is removed thereby making the magnetic stripe operable for completing a magnetic stripe transaction.

19. A method according to claim 1, wherein the RFID module includes:
a RFID transponder responsive to a RF interrogation signal; and
a transponder system database, the database operable to store at least one of the transaction device identifier, account identifier or user identifier in magnetic stripe format, the RFID module operable to send the database information in magnetic stripe format.

20. A method for providing a Radio Frequency Identification (RFID) transaction device, comprising:
providing a transaction device transporter, including an RFID module contained within the transaction device transporter, the RFID module being operable to conduct a RFID transaction using RFID transmission;
pressing a transaction device outline on the transporter, the pressing of the transaction device outline being done circumspect the RFID module, wherein the transaction device outline lies substantially completely within a perimeter of the transaction device transporter, and said pressing is done with sufficient pressure to perforate substantially through the transporter so that the RFID module and the transporter may remain in physical communication; and
providing the transporter, transaction device, and RFID module to a user for the removal of the RFID transaction device including the module from said transporter in accordance with the transaction device outline.

21. A Radio Frequency Identification (RFID) transaction system comprising:
RFID transaction module operable to conduct a RFID transaction using RFID transmission;

a RFID operable transaction device for supporting the module within the transaction device, the RFID module removable from the transaction device for independent operation, wherein the RFID transaction module is formed by pressing a transaction device outline on transaction device transporter, the pressing of the transaction device outline being done circumspect the RFID module, wherein the transaction device outline lies substantially completely within a perimeter of the transaction device transporter, and said pressing is done with sufficient pressure to perforate substantially through the transporter so that the RFID module and the transporter may remain in physical communication.

22. A RFID transaction system according to claim 21, wherein said RFID module is removed from said transaction device through machine punching.

23. A system according to claim 22, wherein said RFID module and said RFID operable transaction device share RFID circuitry prior to removal of the module.

24. A system according to claim 22 wherein said RFID circuitry is in communication with a transaction account issuer for completion of a transaction.

25. A system according to claim 21, wherein said RFID operable transaction is further included in a transaction device transporter.

26. A claim according to claim 25 wherein the transporter includes a magnetic stripe, the magnetic stripe International Standards Organization compliant for conducting transactions in a magnetic stripe environment.

27. A system according to claim 26, wherein said RFID transaction device is removable from said RFID transaction card in accordance with an RFID transaction device outline, the RFID transaction device operable for completing a RFID transaction.

28. A system according to claim 27, wherein said transaction device outline intersects a portion of said magnetic stripe.

29. A system according to claim 28, wherein said magnetic stripe is inoperable to complete a magnetic stripe transaction when at least one of the RFID module and transaction device is removed from said transporter.

* * * * *